United States Patent
Barlettano (12)

(10) Patent No.: US 11,953,256 B2
(45) Date of Patent: Apr. 9, 2024

(54) EVAPORATIVE PERSONAL AIR COOLER WITH CLIP

(71) Applicant: ONTEL PRODUCTS CORPORATION, Fairfield, NJ (US)

(72) Inventor: Scott Barlettano, Wayne, NJ (US)

(73) Assignee: ONTEL PRODUCTS CORPORATION, Fairfield, NJ (US)

( * ) Notice: Subject to any disclaimer, the term of this patent is extended or adjusted under 35 U.S.C. 154(b) by 472 days.

(21) Appl. No.: 16/897,678

(22) Filed: Jun. 10, 2020

(65) Prior Publication Data

US 2020/0300531 A1   Sep. 24, 2020

Related U.S. Application Data

(63) Continuation of application No. 29/729,377, filed on Mar. 26, 2020, now Pat. No. Des. 948,679, and a
(Continued)

(51) Int. Cl.
*F24F 6/04* (2006.01)
*F24F 6/14* (2006.01)
(Continued)

(52) U.S. Cl.
CPC .............. *F25D 17/067* (2013.01); *F24F 6/04* (2013.01); *F24F 6/14* (2013.01); *F24F 5/0035* (2013.01);
(Continued)

(58) Field of Classification Search
CPC ..... F25D 17/067; F24F 5/0017; F24F 5/0035; F24F 6/12; F24F 6/14; F24F 6/16;
(Continued)

(56) References Cited

U.S. PATENT DOCUMENTS

D185,748 S   7/1959   Goettl
D188,357 S   7/1960   Klotz
(Continued)

FOREIGN PATENT DOCUMENTS

CN   3589286 S   12/2006
CN   3643876 S   5/2007
(Continued)

OTHER PUBLICATIONS

COSTWAY Evaporative Cooler—Oscillating Air Cooler with LED Display—Remote Control—125 Square Foot Cooling, 8-Hour Timing Function, for Home & Office, Cooling & Humidification Function (41-Inch), https://www.amazon.com/dp/B07XNTDGLD, accessed May 29, 2020.
(Continued)

*Primary Examiner* — Jerry-Daryl Fletcher
*Assistant Examiner* — Daniel C Comings
(74) *Attorney, Agent, or Firm* — DICKINSON WRIGHT PLLC

(57) ABSTRACT

An evaporative air cooler is described. The evaporative air cooler includes a housing defining an interior of the evaporative air cooler; a tank positioned adjacent to a top portion of the housing, wherein the tank is configured to receive, store, and release liquid; a mister in fluid communication with the tank, wherein the mister is configured to create a mist from the liquid; a filter structure with a filter, wherein the filter is configured to absorb the mist; a fan configured to draw the air into the interior, wherein the air is cooled by at least one of the mist and the filter, and wherein the fan directs the air through the filter structure and from the interior; and a clip coupled to the housing.

19 Claims, 22 Drawing Sheets

Related U.S. Application Data continuation-in-part of application No. 16/239,161, filed on Jan. 3, 2019, now Pat. No. 10,712,029.

(51) Int. Cl.
*F25D 17/06* (2006.01)
*F24F 5/00* (2006.01)
*F24F 6/00* (2006.01)
*F24F 13/20* (2006.01)

(52) U.S. Cl.
CPC ... *F24F 2006/008* (2013.01); *F24F 2006/146* (2013.01); *F24F 13/20* (2013.01); *F24F 2221/12* (2013.01)

(58) Field of Classification Search
CPC .......... F24F 2006/006; F24F 2006/008; F24F 2006/146; F24F 2006/16; F24F 6/04
See application file for complete search history.

(56) References Cited

U.S. PATENT DOCUMENTS

| | | | |
|---|---|---|---|
| 3,176,117 A | 3/1965 | Knoll | |
| 3,583,174 A * | 6/1971 | Logue | F24F 5/0007 261/DIG. 4 |
| 4,016,835 A | 4/1977 | Yarden | |
| D279,815 S | 7/1985 | Yuen | |
| D282,101 S | 1/1986 | Yuen | |
| D282,102 S | 1/1986 | Yuen | |
| D291,350 S | 8/1987 | Sherman | |
| 4,835,982 A | 6/1989 | Ferdows | |
| 4,968,457 A | 11/1990 | Welch | |
| D313,069 S | 12/1990 | McCormick | |
| 4,977,755 A | 12/1990 | Tulley | |
| 5,003,789 A * | 4/1991 | Gaona | F24F 5/0035 62/304 |
| 5,034,033 A * | 7/1991 | Alsup, Jr. | F24F 8/192 96/58 |
| D319,498 S | 8/1991 | Huang | |
| D323,874 S | 2/1992 | Hirman et al. | |
| 5,162,088 A | 11/1992 | Peng et al. | |
| 5,309,726 A | 5/1994 | Asbridge | |
| D361,828 S | 8/1995 | Chen | |
| D367,525 S | 2/1996 | Gruebel | |
| D376,418 S | 12/1996 | Wang | |
| D384,407 S | 9/1997 | Yamada | |
| D402,745 S | 12/1998 | Termeer et al. | |
| D402,746 S | 12/1998 | Clark et al. | |
| D414,253 S | 9/1999 | Kobayashi | |
| D416,993 S | 11/1999 | Dong et al. | |
| 6,059,866 A * | 5/2000 | Yamagata | B01D 53/78 96/265 |
| 6,098,895 A | 8/2000 | Walzel | |
| D433,111 S | 10/2000 | Wright | |
| 6,155,782 A | 12/2000 | Hsu | |
| D448,071 S | 9/2001 | Birdsell et al. | |
| 6,293,121 B1 | 9/2001 | Labrador | |
| D453,558 S | 2/2002 | Segawa et al. | |
| 6,367,277 B1 * | 4/2002 | Kinkel | F28D 5/00 62/310 |
| D468,005 S | 12/2002 | Bailey | |
| 6,581,402 B2 | 6/2003 | Maisotsenko et al. | |
| 6,955,696 B1 | 10/2005 | Ost et al. | |
| D516,689 S | 3/2006 | Salmon et al. | |
| D536,780 S | 2/2007 | Lerche et al. | |
| D543,614 S | 5/2007 | Chen | |
| D553,725 S | 10/2007 | Shimizu | |
| D559,973 S | 1/2008 | Rabito | |
| D594,960 S | 6/2009 | Orihara | |
| D606,645 S | 12/2009 | Orihara | |
| 7,698,906 B2 | 4/2010 | Jarvis | |
| D616,080 S | 5/2010 | Ching | |
| D621,026 S | 8/2010 | Peterson et al. | |
| 7,886,548 B1 * | 2/2011 | Graves | F24F 3/1405 62/93 |
| 7,997,565 B1 * | 8/2011 | Chan | F24F 6/043 261/99 |
| D691,250 S | 10/2013 | Chan | |
| D731,633 S | 6/2015 | Farone et al. | |
| D733,273 S | 6/2015 | Jeon | |
| D733,860 S | 7/2015 | Konno | |
| D769,431 S | 10/2016 | Lopez | |
| D788,279 S | 5/2017 | Lee et al. | |
| D791,290 S | 7/2017 | Shapiro | |
| D804,001 S | 11/2017 | Cartwright | |
| 10,006,648 B2 | 6/2018 | Vandermeulen et al. | |
| D827,115 S | 8/2018 | Petersen | |
| D841,795 S | 2/2019 | Chen | |
| D848,593 S | 5/2019 | Exley | |
| D849,220 S | 5/2019 | Fang | |
| D852,340 S | 6/2019 | Barlettano | |
| D875,235 S | 2/2020 | Coleman et al. | |
| 10,712,029 B1 | 7/2020 | Barlettano | |
| D896,936 S | 9/2020 | Ou | |
| 2004/0129014 A1 | 7/2004 | Richman et al. | |
| 2009/0211291 A1 | 8/2009 | Gildersleeve | |
| 2013/0008195 A1 | 1/2013 | Taljaard | |
| 2014/0174116 A1 * | 6/2014 | Habeebullah | F24F 5/0035 29/890.035 |
| 2014/0260402 A1 | 9/2014 | Varma | |
| 2015/0247644 A1 | 9/2015 | Stearns | |
| 2015/0253046 A1 * | 9/2015 | Parker | F24F 6/04 62/304 |
| 2016/0327289 A1 * | 11/2016 | Mothfar | B60H 1/00264 |
| 2017/0138650 A1 | 5/2017 | Eiserer | |
| 2019/0022677 A1 * | 1/2019 | Zhang | B05B 17/06 |
| 2019/0056124 A1 | 2/2019 | Shen | |
| 2019/0226696 A1 | 7/2019 | Kim et al. | |
| 2019/0277519 A1 * | 9/2019 | Petersen | B01F 23/215 |
| 2020/0018327 A1 * | 1/2020 | Panchenko | F24F 13/00 |
| 2020/0326081 A1 | 10/2020 | Barlettano | |
| 2021/0148584 A1 | 5/2021 | Barlettano | |

FOREIGN PATENT DOCUMENTS

| | | |
|---|---|---|
| CN | 201331225 Y | 10/2009 |
| CN | 201425353 Y | 3/2010 |
| CN | 301559760 S | 11/2010 |
| CN | 301635055 S | 8/2011 |
| CN | 202032693 U | 11/2011 |
| CN | 301743975 S | 11/2011 |
| CN | 202470270 U | 10/2012 |
| CN | 302405864 S | 4/2013 |
| CN | 203385114 U | 1/2014 |
| CN | 302782479 S | 4/2014 |
| CN | 302809630 S | 4/2014 |
| CN | 302809632 S | 4/2014 |
| CN | 203848426 U | 9/2014 |
| CN | 303013053 S | 11/2014 |
| CN | 303321645 S | 8/2015 |
| CN | 106091220 | 11/2016 |
| CN | 106091220 A | 11/2016 |
| CN | 304047506 S | 2/2017 |
| CN | 304206641 S | 7/2017 |
| CN | 304229250 S | 8/2017 |
| CN | 304232931 S | 8/2017 |
| CN | 304275843 S | 9/2017 |
| CN | 107327992 | 11/2017 |
| CN | 107327992 A | 11/2017 |
| CN | 304409176 S | 12/2017 |
| CN | 206905164 U | 1/2018 |
| CN | 207262610 U | 4/2018 |
| CN | 304589588 S | 4/2018 |
| CN | 304594138 S | 4/2018 |
| CN | 304607851 S | 5/2018 |
| CN | 304607887 S | 5/2018 |
| CN | 207527751 U | 6/2018 |
| CN | 304870145 S | 10/2018 |
| CN | 108826551 | 11/2018 |
| CN | 208042402 U | 11/2018 |
| CN | 304934939 S | 12/2018 |
| CN | 304947235 S | 12/2018 |
| CN | 305072142 S | 3/2019 |
| CN | 305223717 S | 6/2019 |

(56) References Cited

FOREIGN PATENT DOCUMENTS

| | | | | |
|---|---|---|---|---|
| CN | 305281766 | S | 7/2019 | |
| CN | 209639184 | U | 11/2019 | |
| CN | 209689113 | U | 11/2019 | |
| CN | 305474029 | S | 12/2019 | |
| CN | 305612741 | S | 2/2020 | |
| CN | 305612750 | S | 2/2020 | |
| CN | 305627369 | S | 2/2020 | |
| CN | 305627370 | S | 2/2020 | |
| CN | 305672142 | S | 3/2020 | |
| CN | 210290192 | U | 4/2020 | |
| CN | 305708993 | S | 4/2020 | |
| CN | 306360588 | S | 3/2021 | |
| EP | 661504 | A1 | 7/1995 | |
| EP | 0017127704-0001 | | 6/2010 | |
| GB | 2420083 | A | 5/2006 | |
| IN | 207975768 | U | 10/2018 | |
| JP | D1258427 | | 12/2005 | |
| JP | 1374275 | | 11/2009 | |
| JP | 1388881 | | 5/2010 | |
| KR | 30-0309259 | | 10/2002 | |
| KR | 30-0309260 | | 10/2002 | |
| KR | 100543336 | B1 | 5/2005 | |
| KR | 30602966-1 | | 6/2013 | |
| KR | 30-0764177 | | 10/2014 | |
| KR | 30-0765886 | | 10/2014 | |
| KR | 1513836 | B1 * | 4/2015 | ......... B01D 46/0005 |
| KR | 30-0865259 | | 7/2016 | |
| KR | 20160083171 | A | 7/2016 | |
| TW | M490518 | U | 11/2014 | |
| WO | 9513506 | | 5/1995 | |
| WO | 2005073642 | A1 | 8/2005 | |
| WO | 2018058132 | A1 | 3/2018 | |
| WO | 2021242295 | A1 | 12/2021 | |

OTHER PUBLICATIONS

NewAir AF-310 Portable Evaporative Air Fan and Humidifier. Personal Indoor Outdoor Swamp Cooler, https://www.amazon.com/NewAir-Portable-Evaporative-Humidifier-AF-310/dp/B009KGB4FK/, accessed on May 29, 2020.
Luma Comfort EC45S Tower Evaporative Cooler with 125 Square Foot Cooling, 250 CFM, https://www.amazon.com/Luma-Comfort-EC45S-Evaporative-Cooling/dp/B007SNQ4FM/, accessed on May 29, 2020.
Global Sources Home Products, No. 10, vol. 8, p. 11, Design Division of the Japan Patent Office; Nov. 27, 2014.
GDSTIME EC Cooling Fan, www.amazon.com/dp/B07H8W376G, retrieved Nov. 7, 2018.
Ontel AA-MC4 Arctic Air Personal Space & Portable Cooler | The Quick & Easy Way to Cool Any Space, As Seen On TV, www.amazon.com/AA-MC4-Arctic-Personal-Portable-Cooler/dp/B0787DD3RX, retrieved Oct. 31, 2018.
Evapolar Air Cooler evaSMART EV-3000 Opaque White US Plug, www.amazon.com/dp/B075G1HBNW, retrieved Oct. 31, 2018.
Evapolar EV1000CART Replacement Evaporative Cartridge for EV-1000 evaLIGHT Personal Air Cooler and Humidifier, www.amazon.com/Evapolar-EV1000CART-Replacement-Evaporative-Humidifier/dp/B06XT5B742, retrieved Oct. 31, 2018.
HoMedics MyChill Personal Space Cooler in Blue, www.amazon.com/HoMedics-MyChill-Personal-Space-Cooler/dp/B075564HQZ, retrieved Oct. 31, 2018.
Filter for Personal Space Cooler, Arctic Air Cooler Replacement Filter Humidifier, www.amazon.com/dp/B07DGWMSH6/, retrieved Oct. 31, 2018.
Ontel Arctic Air Personal Space Cooler Replacement Filter Authentic OEM, www.amazon.com/dp/B07DQ6DXXC/, retrieved Oct. 31, 2018.
World's First Personal Air Cooler (EVAPOLAR), www.youtube.com/watch?v=k4NxBWPTqOA, published Aug. 23, 2016.
Domus, vol. 767, Jan. 31, 1995, p. 108, Design Division of the Japan Patent Office.
Issuance of Notice of Grant for Japanese Design Application No. 2018-013816.
European Search Report; Appl. No. 19154738.9, dated Aug. 29, 2019; 4 pages.
Luonita Portable Air Conditioner, https://www.amazon.com/Luonita-Portable-Conditioner-Humidifier-Evaporative/dp/B07TXZ57XR/, retrieved Mar. 26, 2020.
GLmbllo Baby Stroller Mini Fan, https://www.amazon.com/GLmbllo-Stroller-Portable-Cooler-Child/dp/B07V6R2DC8/ref=sr_1_2?keywords=portable+evaporative+cooler+stroller&qid=1578343377&sr=8-2, retrieved Mar. 26, 2020.
European Search Report for EP Application No. 20793505.7, dated Mar. 27, 2023, 8 pages.

* cited by examiner

EVAPORATIVE PERSONAL AIR COOLER WITH CLIP

CROSS-REFERENCE TO RELATED APPLICATIONS

This application is a continuation of U.S. patent application Ser. No. 29/729,377, filed on Mar. 26, 2020, and a continuation-in-part of U.S. patent application Ser. No. 16/239,161, filed on Jan. 3, 2019, the entire disclosures of which are incorporated herein by reference.

FIELD OF THE INVENTION

The present disclosure relates generally to an evaporative personal air cooler with a clip.

BACKGROUND

Evaporative personal air coolers are commonly used to cool air in a home, office, or other hot, dry air environment. Conventional evaporative air coolers operate by drawing ambient air into the evaporative air cooler and direct it through a water-soaked filter device. As warm air passes through the water-soaked filters, heat from the ambient air evaporates water trapped in the water-soaked filter device. The evaporated water cools the air as it leaves the water-soaked filter device and exits the evaporative air cooler.

Conventional evaporative air coolers typically include a fan, a filter device, and a water distribution system. The fan draws outside air into the evaporative air cooler, pushes it through the filter device to produce cooler air, and then pushes the cooler air out of the evaporative air cooler. More specifically, the water distribution system provides water to the filter device so that the filter device becomes water soaked. The water distribution system includes a water pump that draws water from a reservoir and distributes the water to a bottom surface of the filter device which soaks upwards. Depending on the type of filter and the amount of water in the reservoir, the water may travel only partially up the filters. If the filters are not fully soaked with water, the evaporative air cooler is less effective at producing cooler air. Filter devices typically include filters made of a paper-like material that have to be replaced often. The filters cannot be reused or easily cleaned.

Some of the water distributed to the filter device evaporates as air flows through the filters. The water in the reservoir depletes as the evaporative air cooler operates due to the evaporation. Any unabsorbed water that recirculates within the evaporative air cooler returns to the reservoir. When the reservoir is fully depleted of water but the filter device is soaked with water, the evaporative air cooler can still produce cooler air, but it becomes less effective. The evaporative air cooler will cease producing cooler air when the filter device is dry. Thus, additional water must be constantly added to replace the water that has been evaporated.

It typically takes conventional evaporative air coolers a considerable period of time to begin cooling air because the filter device must soak up water from the reservoir before the cooling process can begin. In other words, conventional evaporative air coolers do not instantly produce cooler air.

Furthermore, conventional evaporative air coolers are typically placed on a flat surface, such as a table, a countertop, or a desk in order to cool people in a room. Conventional evaporative air coolers are not configured to attach onto devices, such as an end of a shelf or a stroller handle.

SUMMARY

This section provides a general summary of the present disclosure and is not a comprehensive disclosure of its full scope or all of its features, aspects, and objectives.

Disclosed herein are implementations of an evaporative air cooler. The evaporative air cooler includes a housing defining an interior of the evaporative air cooler; a tank positioned adjacent to a top portion of the housing, wherein the tank is configured to receive, store, and release liquid; a mister in fluid communication with the tank, wherein the mister is configured to create a mist from the liquid; a filter structure with a filter, wherein the filter is configured to absorb the mist; a fan configured to draw the air into the interior, wherein the air is cooled by at least one of the mist and the filter, and wherein the fan directs the air through the filter structure and from the interior; and a clip coupled to the housing.

Also disclosed herein are implementations of an evaporative air cooler comprising a housing defining an interior of the evaporative air cooler; a tank positioned adjacent to a top portion of the housing, wherein the tank is configured to receive, store, and release liquid; a mister in fluid communication with the tank, wherein the mister is configured to create a mist from the liquid; a filter structure with a filter, wherein the filter is configured to absorb the mist; a fan configured to draw the air into the interior, wherein the air is cooled by at least one of the mist and the filter, and wherein the fan directs the air through the filter structure and from the interior; an angling member coupled to the housing, wherein the angling member is configured to rotate the housing; and a clip coupled to the angling member.

Also disclosed herein are implementations of an evaporative air cooler comprising a housing defining an interior of the evaporative air cooler; a tank positioned adjacent to a top portion of the housing, wherein the tank is configured to receive, store, and release liquid; a mister in fluid communication with the tank, wherein the mister is configured to create a mist from the liquid; a filter structure with a filter and a second filter, wherein the filter and the second filter are configured to absorb the mist; a fan configured to draw the air into the interior, wherein the air is cooled by at least one of the mist, the filter, and the second filter, and wherein the fan directs the air through the filter structure and from the interior; and a clip coupled to the housing.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
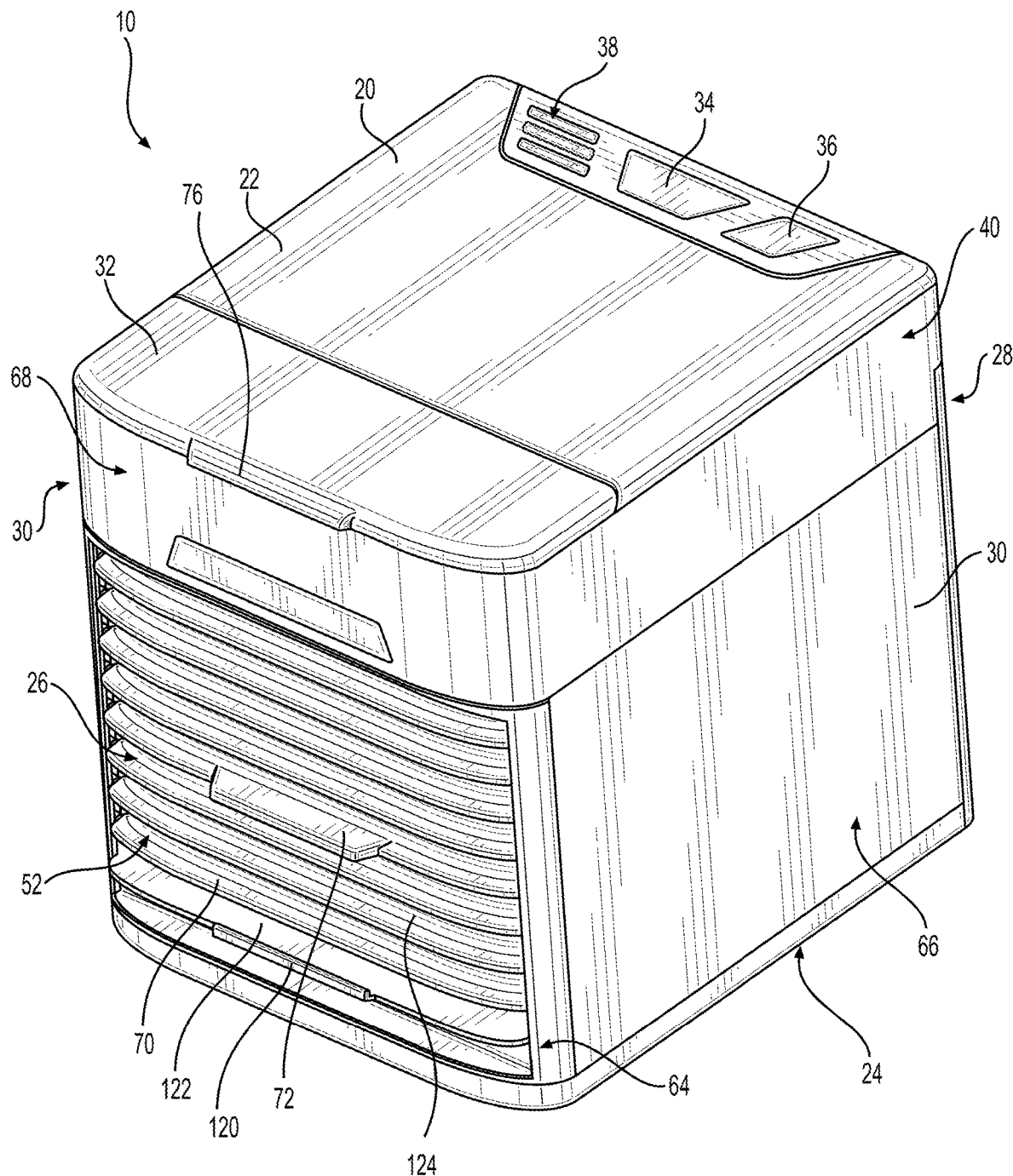
FIG. 1 is a perspective view of an evaporative personal air cooler in accordance with aspects of the present disclosure.

The following description is merely exemplary in nature and is not intended to limit the disclosure in its application or uses. For purposes of clarity, the same reference numbers are used in the description and drawings to identify similar elements.

The present disclosure relates generally to an evaporative personal air cooler by which it draws in ambient air, cools the ambient air, and blows out the cooled ambient air. In this disclosure, the evaporative personal air cooler may be referred to as an evaporative air cooler, a portable evaporative air cooler, or any other desirable air cooler.

The evaporative air cooler 10 can include a housing 20 having a power adapter, a water tank 40, a v-shaped shroud 44, a fan 48, a drawer 50, and a filter structure 56.

FIG. 1 illustrates an exemplary evaporative air cooler 10. The evaporative air cooler can include the housing 20 with a top face 22, a bottom face 24, and four lateral faces, such as a front face 26, a back face 28, and side faces 30. The housing 20 can be formed as a cube housing, a rectangular housing, or any other desirable configuration or shape. The housing 20 can be formed from plastic or any other desirable material.

Figure 2:
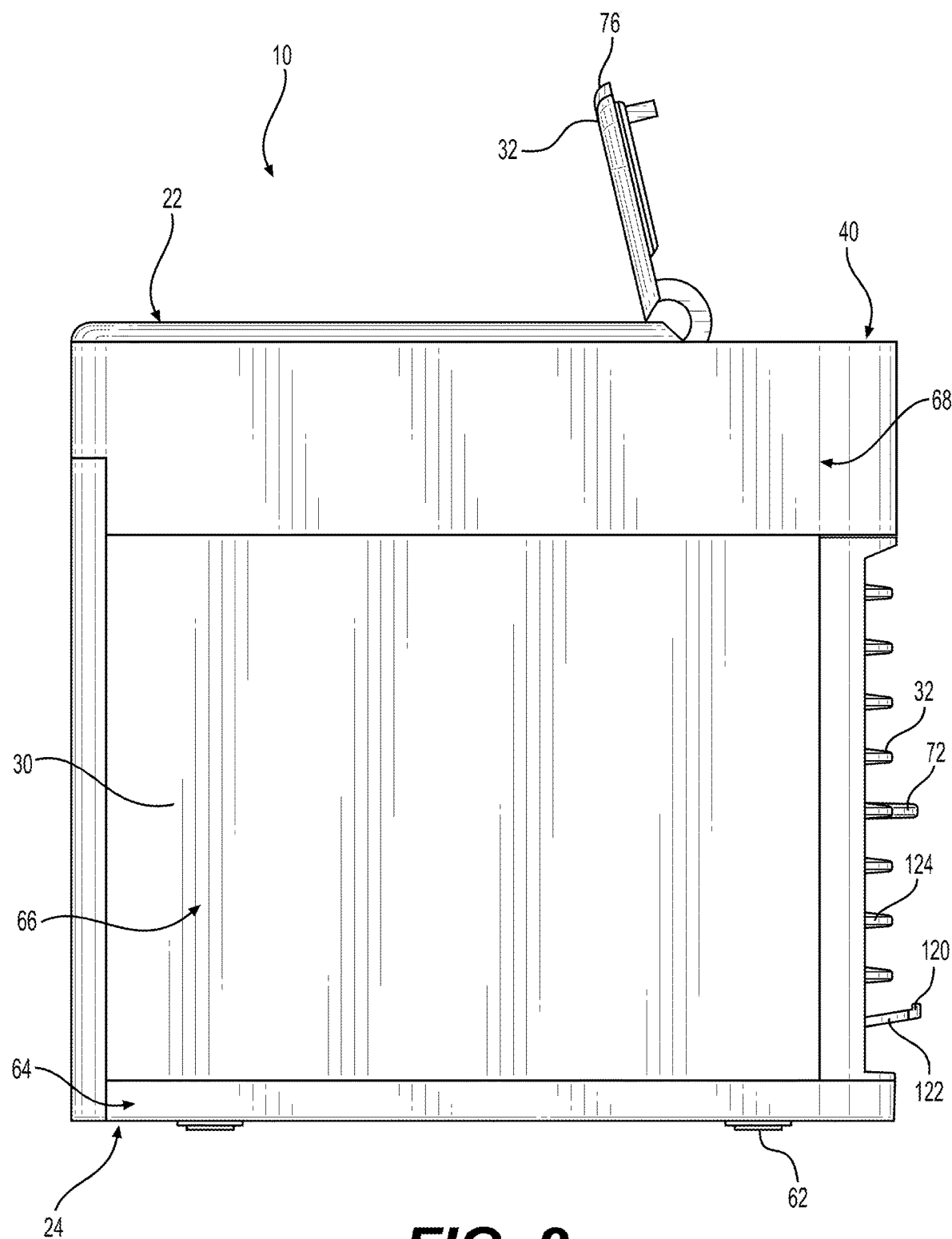
FIG. 2 is a side view of the evaporative personal air cooler in accordance with aspects of the present disclosure.

The top face 22 can include a lid, such as a hinged lid 32. FIG. 2 illustrates the evaporative air cooler 10 with the hinged lid 32 opened for access to the water tank 40. The hinged lid 32 can be located along a front portion of the top face 22. The hinged lid 32 can include a lid tab 76 positioned in the front of the hinged lid 32 or any other desirable location. The hinged lid 32 can be opened to allow for water to fill the water tank 40. For example, a user can pull the lid tab 76 upward to open the hinged lid 32. The hinged lid 32 can be formed from plastic or any other desirable material. The opening to the water tank 40 can be any desirable opening and is not limited to the hinged lid 32 described in this disclosure.

The top face 22 can also include buttons, such as a power button 34, a light button 36, or any other desirable button. The top face 22 can also include one or more lights, such as an indicator light 38 or any other desirable light or indicator. The indicator light 38 may be used to indicate a fan speed, a level of water located within the water tank 40, whether filters 58 should be replaced, or any other desirable indication. For example, at a high speed, all three indicator lights 38 can be powered ON. At a medium speed, two indicator lights 38 can be powered ON. At a low speed, one indicator light 38 can be powered ON. In one embodiment, if the power button 34 is held down for at least three seconds, the indicator lights 38 can all turn off. The indicator light 38 may include one or more lights. The indicator light 38 may display a blinking light or a solid light. The indicator light 38 may display different light colors, such as green, red, amber, or any other desirable color.

The power button 34 can be configured to activate (e.g., power ON), change the fan speed of the fan 48, and deactivate (e.g., power OFF) the evaporative air cooler 10. For example, when the power button 34 is first activated, the indicator light 38 (e.g., three indicator lights 38) can turn ON, the fan 48 can turn ON (e.g., to a high speed), and an aperture 42 positioned in the water tank 40 can allow water to flow out of the tank 40 to begin the evaporative air cooling process. When the power button 34 is activated a second time, one of the indicator lights 38 can turn OFF (e.g., two indicator lights 38 remain ON), the fan speed can decrease (e.g., to a medium speed), and the aperture 42 can allow less water to flow out of the tank 40. When the power button 34 is activated a third time, one of the indicator lights 38 can turn OFF (e.g., one indicator light 38 remain ON), the fan speed can decrease (e.g., to a low speed), and the aperture 42 can allow less water to flow out of the tank 40. When the power button 34 is activated a fourth time, one of the indicator lights 38 can turn OFF (e.g., no indicator lights 38 remain ON), the fan 48 can turn OFF, and the aperture 42 can stop the water from flowing out of the tank 40. In other words, the power button 34 can be activated to deactivate, or power OFF the evaporative air cooler 10. In one embodiment, when the power button 34 is activated (e.g. pressed downward) for three or more seconds, it can turn OFF the indicator lights 38 and the evaporative air cooler 10.

The fan 48 can be wired to the evaporative air cooler 10. The wires can be soldered to electrically connect the fan 48 to the evaporative air cooler 10, or attached in any other desirable way. The wires can be hidden in a wire compartment or any other desirable compartment within the evaporative air cooler 10.

A light, such as a blue LED light, can be positioned within the water tank 40, such as beneath the power button 34, or any other desirable area for illuminating the water tank 40. The light can be used for ambiance, as a nightlight, or any other desirable purpose. The light may be on by default when the evaporative air cooler 10 is powered ON. The user can lower the brightness of the light or turn OFF the blue LED completely by pressing the light button 36. For example, after the power button 34 is pressed, the light is on a high brightness mode. When the user presses the light button 36 for a first time, the light can reduce its brightness (e.g., to a low brightness mode). When the user presses the light button for a second time, the light can turn OFF. In one embodiment, if the light button 36 is activated for a minimum amount of time (e.g., three seconds), an illumination setting can be selected and/or locked.

As illustrated in FIG. 2, the bottom face 24 can include feet 62 that project outward from the bottom face 24. The feet 62 can be configured to elevate the evaporative air cooler 10 from a surface it is placed on. The feet 62 can also be configured to prevent the evaporative air cooler 10 from damaging the surface. For example, when sliding the evaporative air cooler 10 across the surface, the feet 62 can prevent the scratching of the surface. The feet 62 may be formed from rubber, plastic, grips, or any other desirable material. The bottom face 24 can include a plurality of feet 62. The feet 62 may be formed as circular feet 62, ovular feet 62, square feet 62, rectangular feet 62, or any other desirable shape. The feet 62 can be positioned toward each corner of the bottom face 24, or any other desirable location. In an alternative embodiment, the bottom face 24 does not include feet 62.

The lateral faces can include a front face 26, a back face 28, and two side faces 30. The lateral faces can be positioned between the top face 22 and the bottom face 24 about their outer perimeters. The lateral faces can be positioned adjacent each other. The lateral faces can include a framed portion 64 and a face portion 66. The framed portion 64 can be positioned about a perimeter of a lateral face, wherein the face portion 66 is positioned within the framed portion 64. For example, the side faces 30 can include an upper portion 68, the framed portion 64 positioned adjacent the upper portion 68 and along the side and bottom edges of the side faces 30, and a face portion 66 positioned within the framed portion 64.

Figure 3:
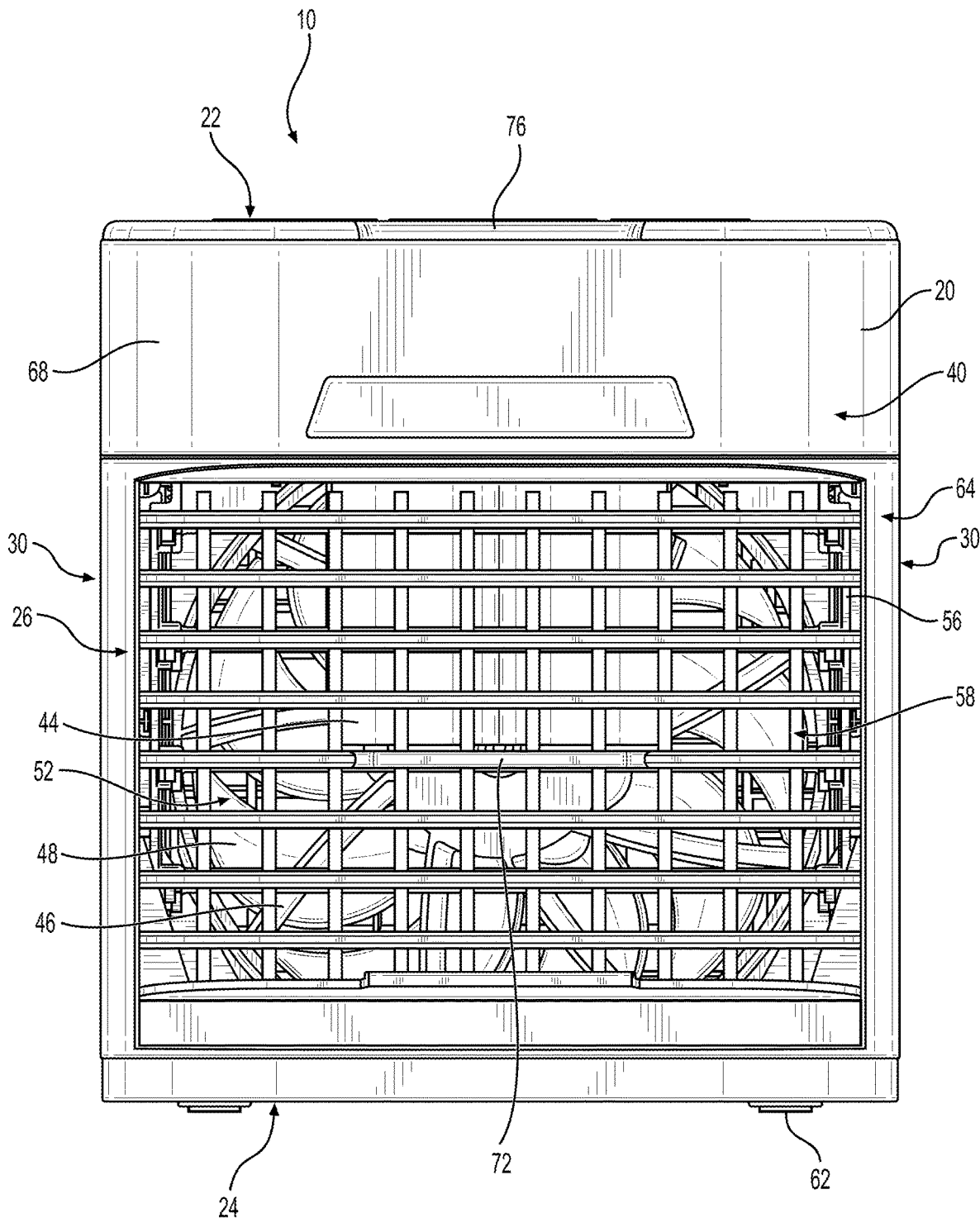
FIG. 3 is a front view of the evaporative personal air cooler in accordance with aspects of the present disclosure.

As illustrated in FIG. 3, the front face 26 can include an upper portion 68 and a framed portion 64 positioned adjacent the upper portion 68 and along the side and bottom edges of the top face 22. The front face 26 can also include an outlet vent 52 positioned within the framed portion 64. The outlet vent 52 can include a plurality of vents 70, an air direction tab 72, and a filter drawer tab 120. The plurality of vents 70 can include a fixed vent 122 and an adjustable vent 124. For example, the fixed vent 122 may be positioned as the lowest vent 70 on the outlet vent 52. The remainder of the plurality of vents 70 may consist of the adjustable vent 124. Each of the plurality of vents 70 can be positioned horizontally in the outlet vent 52. Each of the adjustable vents 124 can be movably connected to the air direction tab 72. The air direction tab 72 can be positioned to direct air flowing from inside the evaporative air cooler 10 through the outlet vent 52. For example, if the air direction tab 72 is positioned upward, the adjustable vents 124 may be positioned in an upward position to direct the airflow upward. Similarly, if the air direction tab 72 is positioned downward, the adjustable vents 124 may be positioned in a downward position to direct the airflow downward. If the air direction tab 72 is positioned in a center position, the adjustable vents 124 may be positioned in a substantially horizontal position, directing the air to flow horizontally from the evaporative air cooler 10. The air direction tab 72 can direct the air to flow at any angle between the downward and upward angles.

Figure 4:
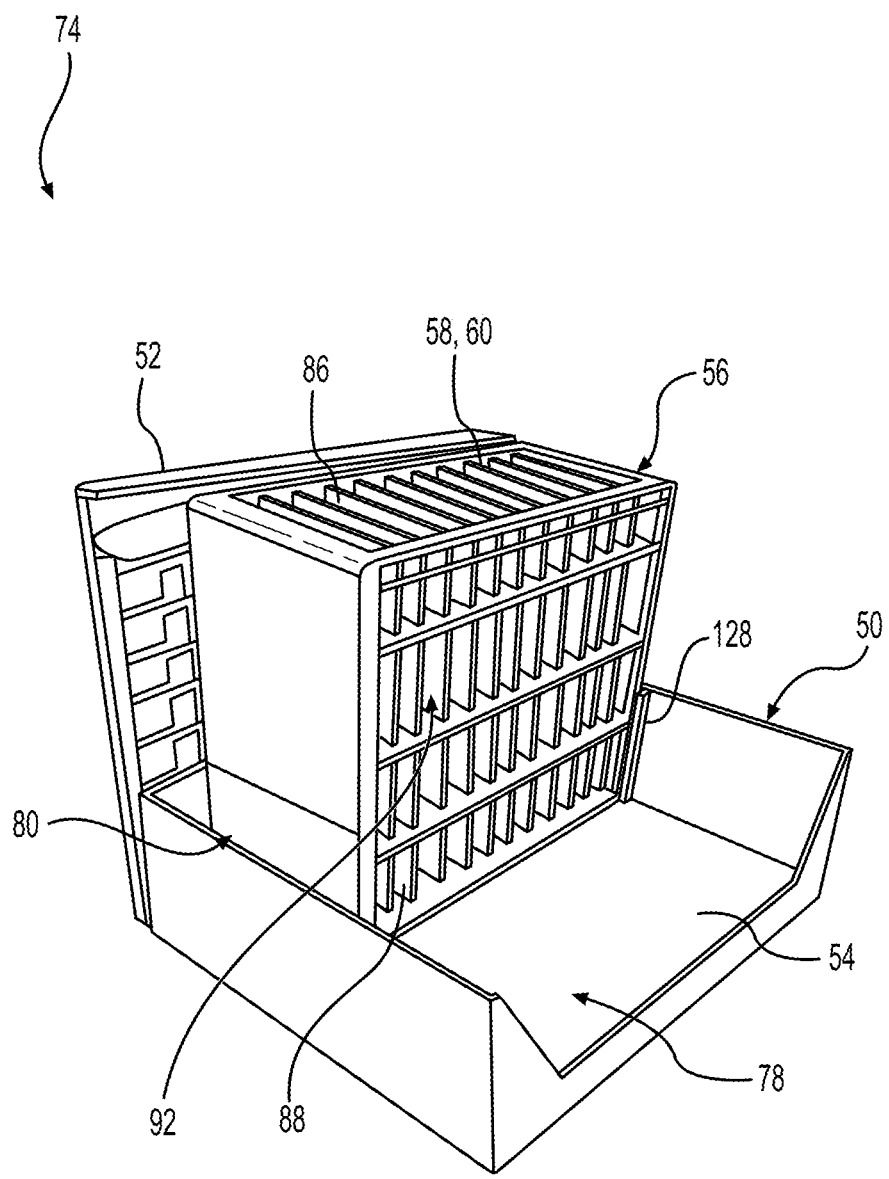
FIG. 4 is a perspective view of an internal assembly of the evaporative personal air cooler in accordance with aspects of the present disclosure.
Figure 5:
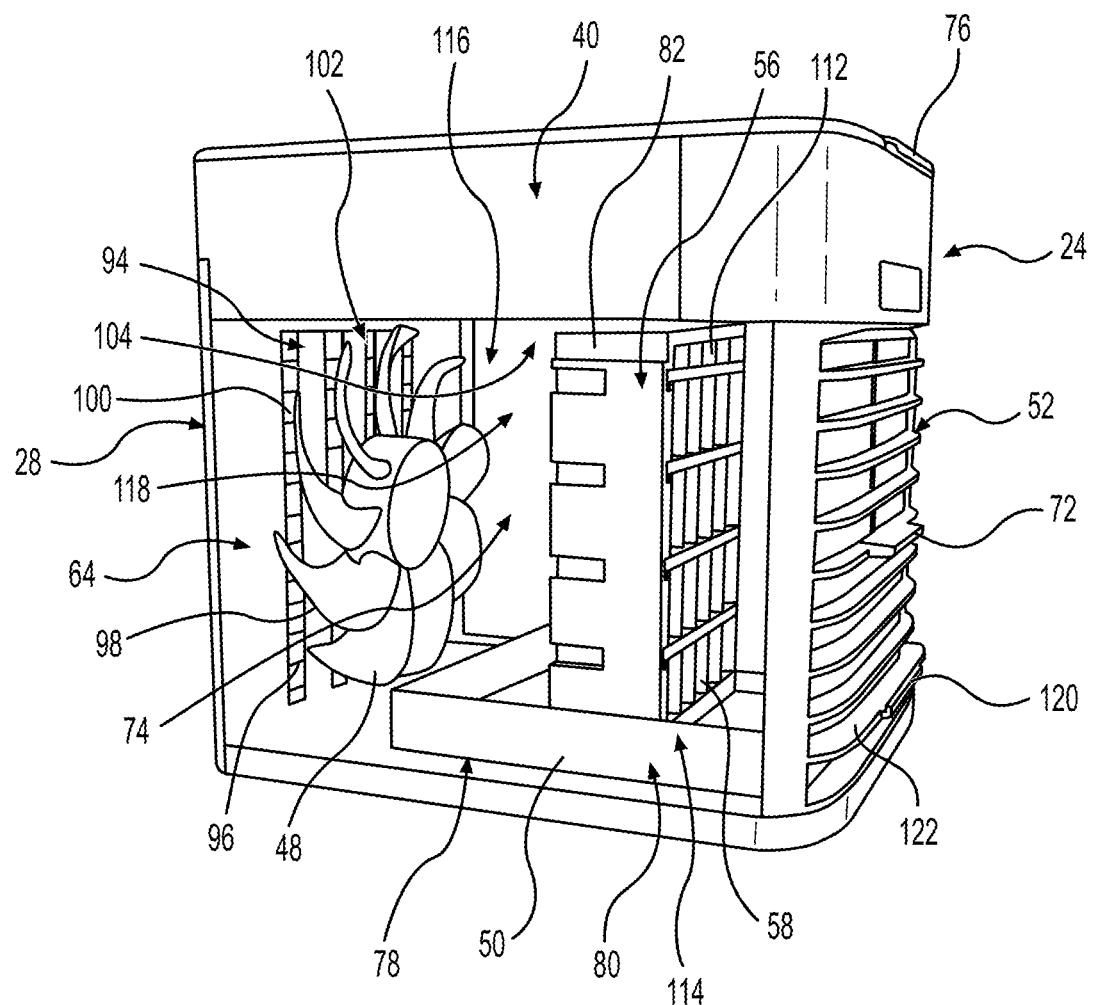
FIG. 5 is a perspective view of an interior of the evaporative personal air cooler in accordance with aspects of the present disclosure.

The face portion 66 of the front face 26, such as the outlet vent 52, can be connected to an internal assembly 74 that is removable from the housing 20. As illustrated in FIGS. 4 and 5, the internal assembly 74 of the evaporative air cooler 10 can include the filter structure 56 including filters 58, the drawer 50 including a water tray 54. The internal assembly 74 can fit tightly around the circumference of the fan 48. For example, the internal assembly 74 can form a seal around the fan 48 to direct air out of the evaporative air cooler 10. The internal assembly 74 can be configured to increase the force of the air as it exits the evaporative air cooler 10 to increase the cooling effect of the evaporative air cooler 10. The internal assembly 74 may also be configured to decrease noises produced during operation of the evaporative air cooler 10. For example, the seal, such as an airtight seal, reduces the amount of air escaping from the evaporative air cooler 10 and reduces air vibrating off of other components or the walls of the evaporative air cooler 10.

The drawer 50 can be attached to the outlet vent 52. The outlet vent 52 can be removed from the evaporative air cooler 10. For example, the fixed vent 122 can include a filter drawer tab 120. The user can pull on the filter drawer tab 120 to remove the outlet vent 52 from the evaporative air cooler 10. The outlet vent 52 can have one or more tabs or any other desirable device for removing the outlet vent 52 from the evaporative air cooler 10. An interior side of the side faces 30 can include a drawer guide 108. The drawer guide 108 is configured to assist the user in slidably removing and inserting the drawer from and into the housing 20.

The drawer 50 can include the water tray 54. The water tray 54 can be positioned in the drawer 50. The water tray 54 can be formed as the bottom of the housing 20. The water tray 54 can be angled for any liquid on the water tray 54 to flow in a direction toward the filter structure 56. For example, the water tray 54 can be higher toward a back end 78 of the drawer 50 than toward the front end 80 of the drawer. The water tray 54 can be configured for cleaning. For example, when the drawer 50 is removed from the evaporative air cooler 10 and the filter structure 56 is removed from the water tray 54, the water tray 54 can be easily accessible for cleaning. The user can wipe down and dry or otherwise clean the water tray 54. Cleaning the water tray 54 may result in less mold or other bacteria.

The drawer 50 can be configured to support the filter structure 56. The filter structure 56 can be removably attached to the drawer 50. The drawer 50 can have a drawer notch 128 to secure the filter structure 56 in place. For example, the filter structure 56 can be placed on a top surface of the water tray 54 between the outlet vent 52 and the drawer notch 128.

Figure 6A:
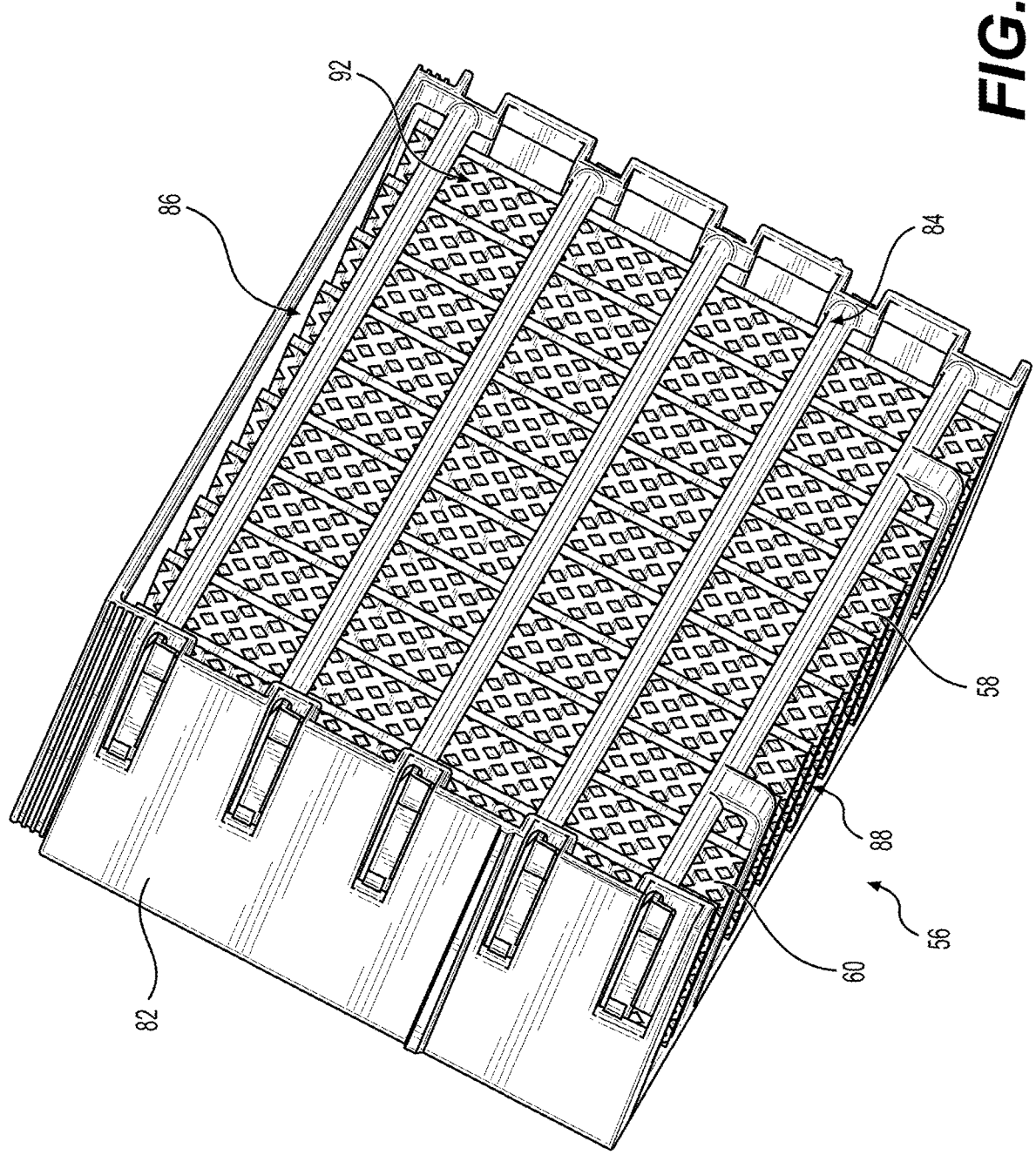
FIGS. 6A-6B are perspective views of a filter structure of the evaporative personal air cooler in accordance with aspects of the present disclosure.
Figure 6B:
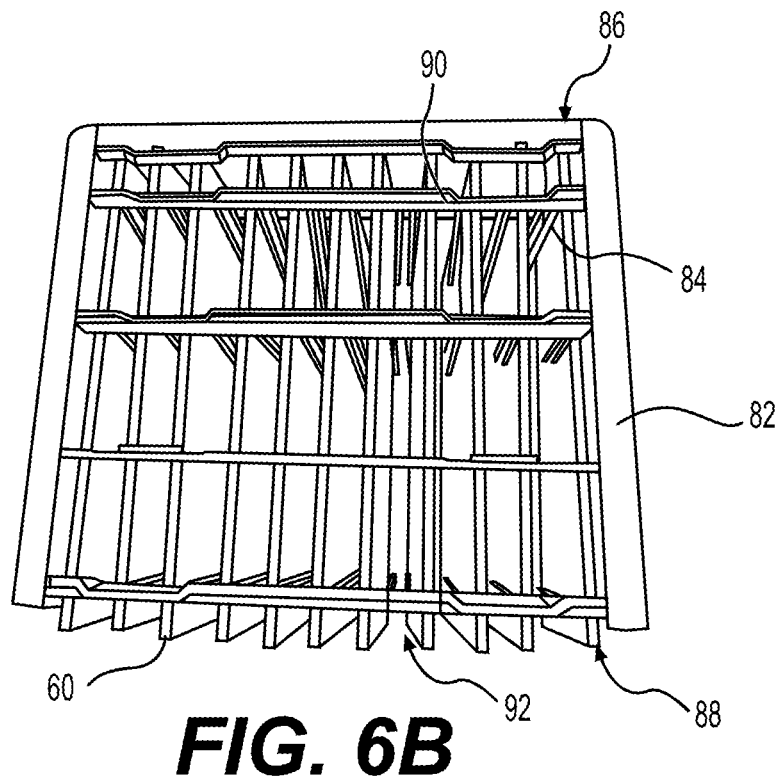
Figure 6C:
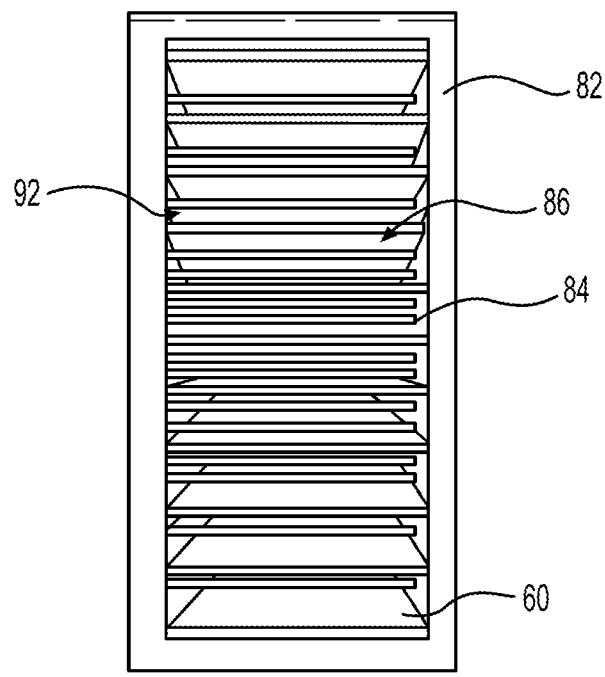
FIG. 6C is a top view of a filter structure of the evaporative personal air cooler in accordance with aspects of the present disclosure.

As illustrated in FIGS. 6A-6C, the filter structure 56 can include a filter frame 82 and a plurality of filter holders 84 attached to opposing sides of the filter frame 82. In one exemplary embodiment, as illustrated in FIG. 6C, the filter frame 82 can include a top opening 86 and a bottom opening 88. The top opening 86 can be configured to allow for a mist 118 to contact top portions 112 of the filters 58. The bottom opening 88 can be configured to allow for the mist 118 and/or liquid, such as water, to contact bottom portions 114 of the filters 58. For example, if liquid has collected in the water tray 54, the liquid can contact bottom portions 114 of the filters 58. The sponge material 60 of the filters 58 may soak up the liquid. The sponge material 60 may also soak up the mist 118 as it contacts the filters 58. The filter holders 84 can define a plurality of holes, or filter openings 90. Each filter opening 90 can be configured for one filter 58 to be positioned within it. The filter holders 84 can be positioned substantially parallel to each other within the filter structure 56. The filter holders 84 can be configured to hold the filters 58 in place. The filters 58 can be positioned substantially parallel to each other and to opposing sides of the filter structure 56. The filter holders 84 can be configured with space, such as air gaps 92, between each filter holder 84 to allow for the mist 118 and/or liquid to contact the filters 58. The air and/or the mist 118 may also flow through the air gaps 92 and out of the evaporative air cooler 10. The filter structure 56 can be formed from plastic, metal, or any other desirable material.

As shown in FIGS. 4-6, the filter structure 56 can include a plurality of filters 58 mounted vertically. The filters 58 can be positioned parallel to the direction of airflow. The filters 58 can be formed from a sponge material 60. The filters 58 can be soaked prior to use. For example, the user can pull the filter drawer tab 120 on the outlet vent 52 to pull out the internal assembly 74, including the drawer 50, water tray 54, and the filter structure 56. The internal assembly 74 can slide out from within the evaporative air cooler 10. The filter structure 56 can be removed from drawer 50. The filter structure 56 can be placed in liquid, such as water, placed under running water, or any other desirable method to soak the filters 58. After the filters 58 are wet, the filter structure 56 can be placed in the freezer, or any other desirable cooling device. If the wet filters 58 are frozen, the cooling effect of the evaporative air cooler 10 can be enhanced. When complete, the user can put the filter structure 56 on the drawer 50 and slide the internal assembly 74 back into the evaporative air cooler 10. If the filters 58 are pre-moistened, the initial cooling effect can increase because air travels through the wet filters 58 when the evaporative air cooler 10 first starts running. If the filters 58 are not presoaked, the evaporative air cooler 10 can produce cool air, but it may not be at capacity.

The filter structure 56, including the plurality of filters 58, can be constructed of sponge material 60, plastic and sponge material 60, or any other desirable material. The filter structure 56, together with the filters 58, can be configured for cleaning. For example, the plastic and sponge material 60 can be cleaned using various methods, such as hand-washing, soaking, dishwasher, or any other desirable method. The filter structure 56, including the filters 58, can be sanitized. For example, the filter structure 56, including the filters 58, can be sanitized in a microwave or any other desirable method. The filters 58 can be handled, washed, and used more vigorously than filters formed from paper material. The filters 58 can be reusable, used longer while wet, re-moistened and re-dried, and have an overall longer life-time and usability than paper filters. The filter structure 56 can be replaced, for example, after three to six months of use.

The evaporative air cooler 10 can also be powered ON without water in the water tank 40 to dry out the filters 58 and the interior of the evaporative air cooler 10. For example, if a user plans to not use the evaporative air cooler 10 for an extended period of time, the user can empty the water tank 40, press the power button 34 to turn the evaporative air cooler 10 ON to the high mode for a period of time, such as for four hours.

The back face 28 can include the upper portion 68 and the framed portion 64. The back face 28 can include a power port for the power adapter. The power adapter includes a cord with a first power adapter plug on one end that is configured to plug into the power port and a second power adapter plug on the opposite end of the cord that is configured to plug into an outlet, such as a wall outlet or a power strip. The power port can be located in the upper portion 68 of the back face 28 or any other desirable location on the evaporative air cooler 10. In another embodiment, the evaporative air cooler 10 can be powered using batteries or another power source.

The back face 28 can also include a grate 94. The grate 94 can be positioned within the framed portion 64. The grate 94 can include a plurality of ribs positioned horizontally or vertically along the back face 28. As shown in FIGS. 5 and 6, the grate 94 includes both horizontal ribs 96 and vertical ribs 98 that define a plurality of grate openings 100. The plurality of grate openings 100 are configured to allow air to flow from outside the evaporative air cooler 10 to inside the evaporative air cooler 10. The grate 94 may also have a cord guide for securing the cord of the power adapter in place. The cord guide may be located along one side of the grate 94 and adjacent to the framed portion 64, or any other desirable location. The grate 94 may have one or more cord guides tabs. Additionally, some of the horizontal ribs 96 may be shorter to allow for the cord to be positioned flush with the horizontal ribs 96.

Figure 7:
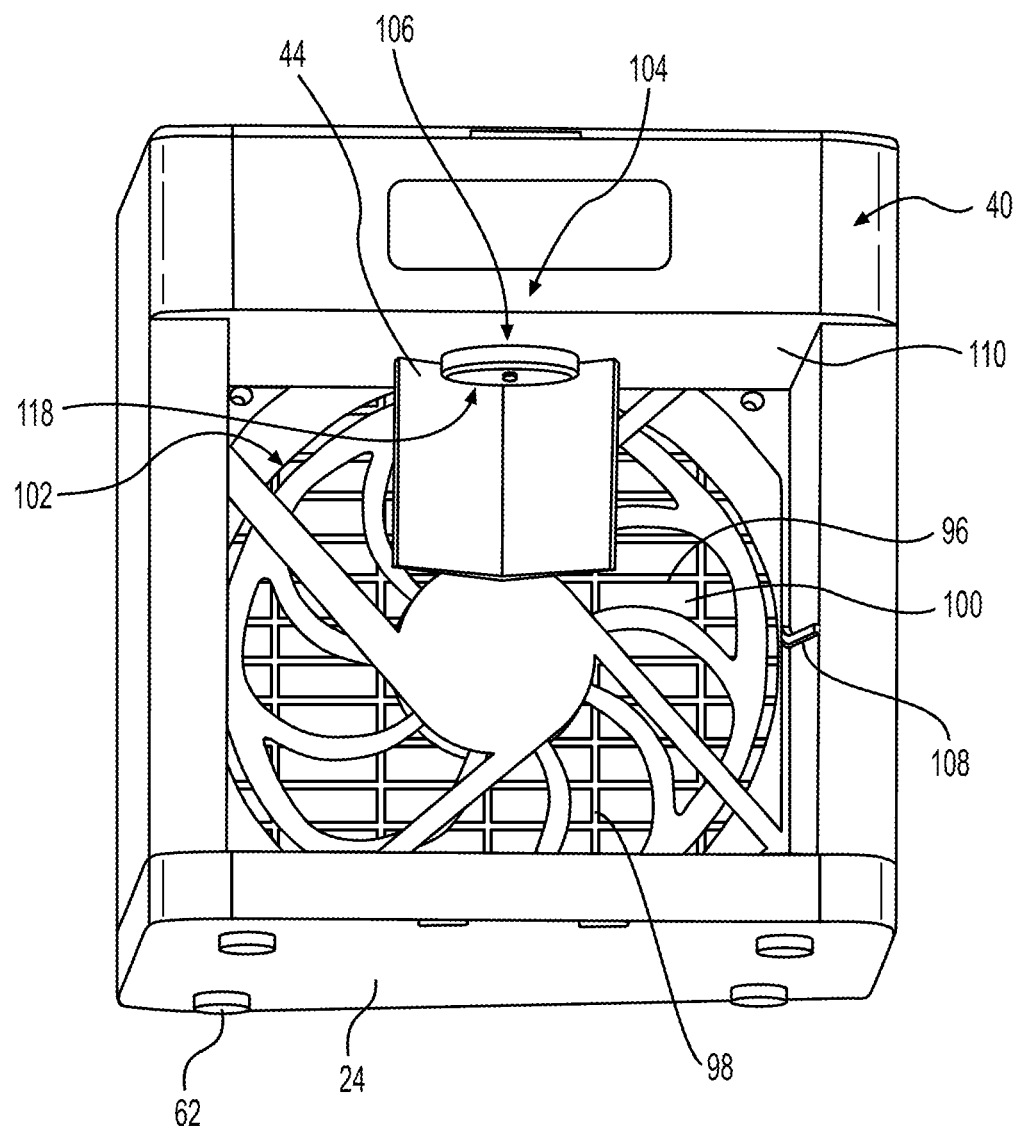
FIG. 7 is a front perspective view of the evaporative personal air cooler after the internal assembly is removed in accordance with aspects of the present disclosure.
Figure 8:
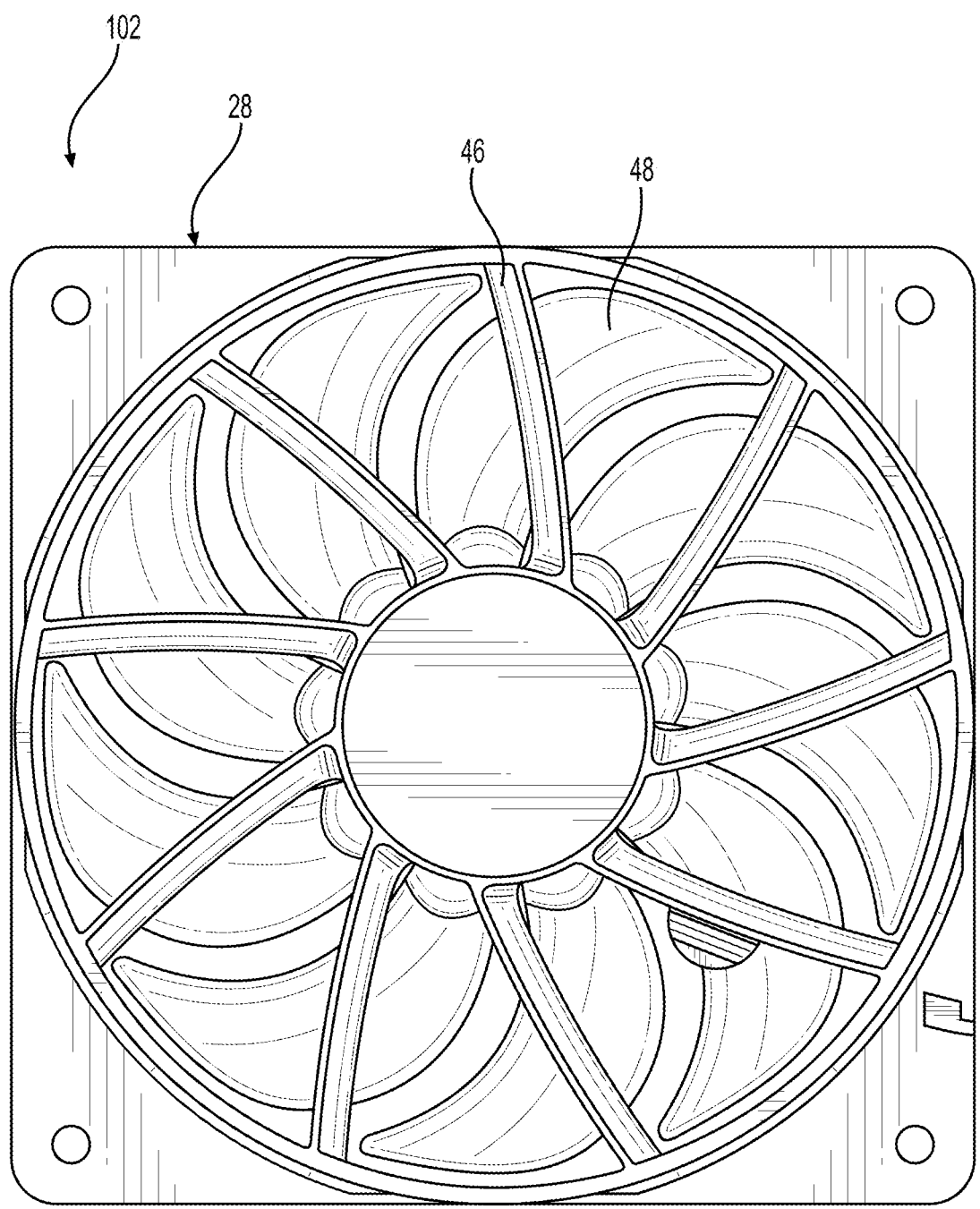
FIG. 8 is a front view of a fan cover assembly of the evaporative personal air cooler in accordance with aspects of the present disclosure.

As illustrated in in FIGS. 7 and 8, the fan cover assembly 102 can include the grate 94, the fan 48, and a fan cover 46. The fan cover assembly 102 can be configured to reduce vibration and other movement within the evaporative air cooler 10. By doing so, the fan cover assembly 102 can reduce the noise of operation of the evaporative air cooler 10. The fan cover assembly 102 can also efficiently direct airflow. For example, the fan cover assembly 102 can effectively direct air outward from the evaporative air cooler 10.

For example, the fan 48 can direct airflow from the back face 28 toward the front face 26. The fan 48 can be positioned inside the housing 20 between the grate 94 and the fan cover 46. The fan cover 46 can be configured to further direct the airflow. For example, the fan cover 46 can provide an optimal volume of air flow for the size and type of the evaporative air cooler 10. The fan cover 46 can be configured to maximize the technical and electrical specifications of the fan 48.

The user can control the speed of the fan 48. For example, the user can press the power button 34 to toggle the fan speed between three different speeds (e.g., high, medium, and low speeds). Changing the fan speed can change the water flow rate through the aperture 42. The change in the water flow rate can be proportional to the change in the fan speed. At the high speed, the water flow rate can be at a high rate. At the medium speed, the water flow rate can be at a medium rate. At the low speed, the water flow rate can be at a low rate.

Thus, the misting structure 104 can be configured to produce a variable volume of the mist 118. The volume of the mist 118 produced can be based on the fan speed. For example, as the fan speed increases, the volume of the mist 118 can increase. The increase in the volume of the mist 118 may allow for an optimal amount of moisture to enter into the air, which can result in a better cooling effect. As the fans speed decreases, so may the mist volume.

For example, when the power button 34 is pressed, the evaporative air cooler 10 can turn on. The fan 48 can begin spinning, and the mist 118 can begin to spray from a misting structure 104. The default fan speed can be the high speed when the evaporative air cooler 10 is first powered ON, or any other desirable fan speed. The user can adjust the cooling effect of the evaporative air cooler 10, including the amount of the mist 118 and/or the airflow speed using the power button 34. The user can adjust the airflow direction (e.g., from top to bottom) using the air direction tab 72 on the outlet vent 52. The power button 34 can be pressed again to turn off the evaporative air cooler 10.

As illustrated in FIG. 7, the v-shaped shroud 44 can be positioned on an underside of the top internal panel 110 to allow liquid to transform into the mist 118. The top internal panel 110 can be a wall between the evaporative air cooler 10 and the water tank 40, the bottom of the water tank 40, or any other desirable structure. The v-shaped shroud 44 can be configured to distribute the mist 118 evenly toward the filters 58. An even distribution of liquid on the filters 58 provides an effective cooling effect for the user. The v-shaped shroud 44 can be configured to maximize airflow to the user.

For example, the v-shaped shroud 44 can extend from the bottom of the water tank 40 into the evaporative air cooler 10. The fan 48 used with the v-shaped shroud 44 can turn the liquid into the mist 118 and direct the mist 118 toward the filter structure 56 and filters 58. Some of the mist 118 may evaporate, and some of the mist 118 may travel between the sponge material 60 and through outlet vent 52 to cool the air outside of the housing 20. Some of the mist 118 can soak into the sponge material 60, allowing for later evaporative cooling. Some of the mist 118 can fall into the water tray 54, where it can collect and turn into liquid. The liquid can be absorbed into the filters 58 via capillary action, to allow for additional evaporative cooling. The water tray 54 can be constructed with a slight angle. The slight angle can cause excess or unabsorbed liquid to flow toward the filters 58. The excess liquid can be absorbed by the filters 58 and wicked up, allowing for a longer cooling effect. Also, wicking up the excess water can result in a reduction of water spills if the evaporative air cooler 10 is moved or the drawer 50 is removed from the evaporative air cooler 10.

Figure 9:
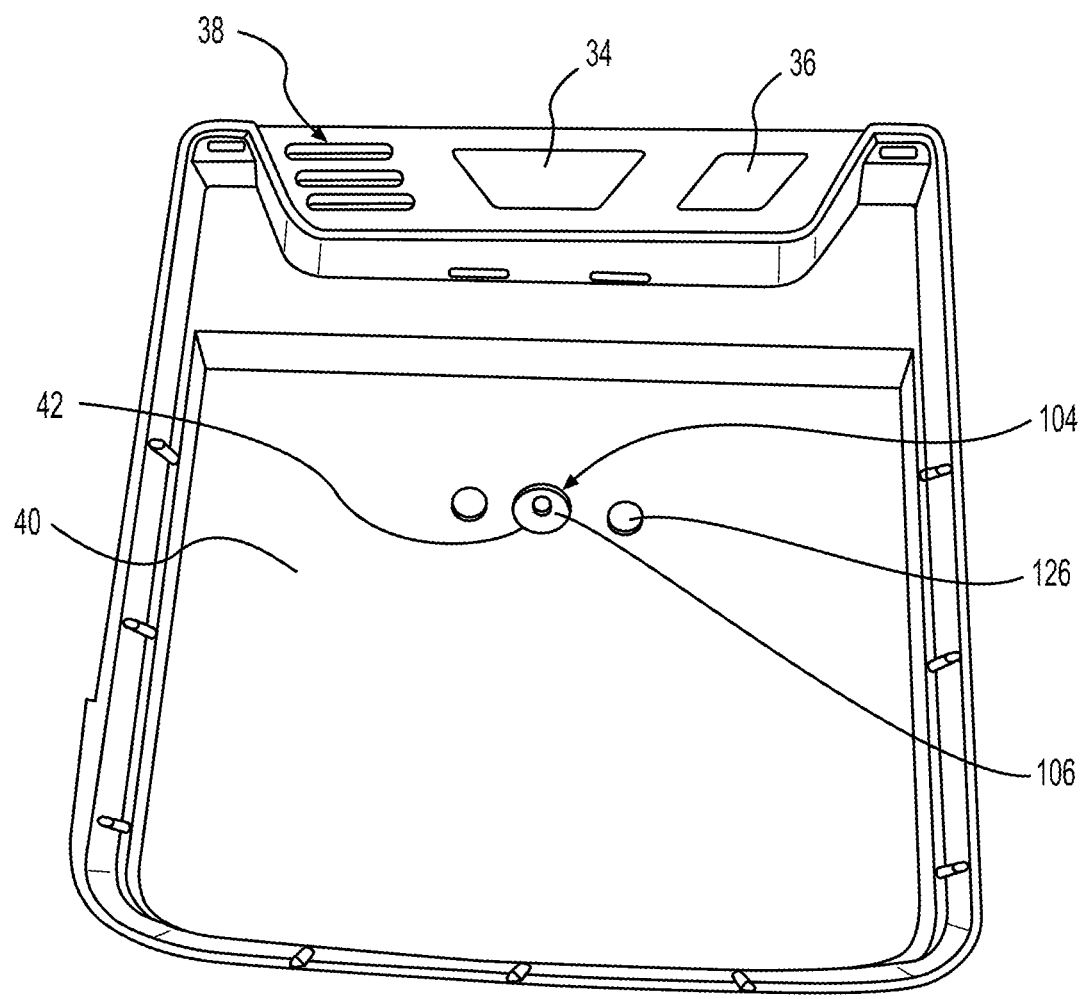
FIG. 9 is a top view of a water tank of the evaporative personal air cooler in accordance with aspects of the present disclosure.
Figure 10:
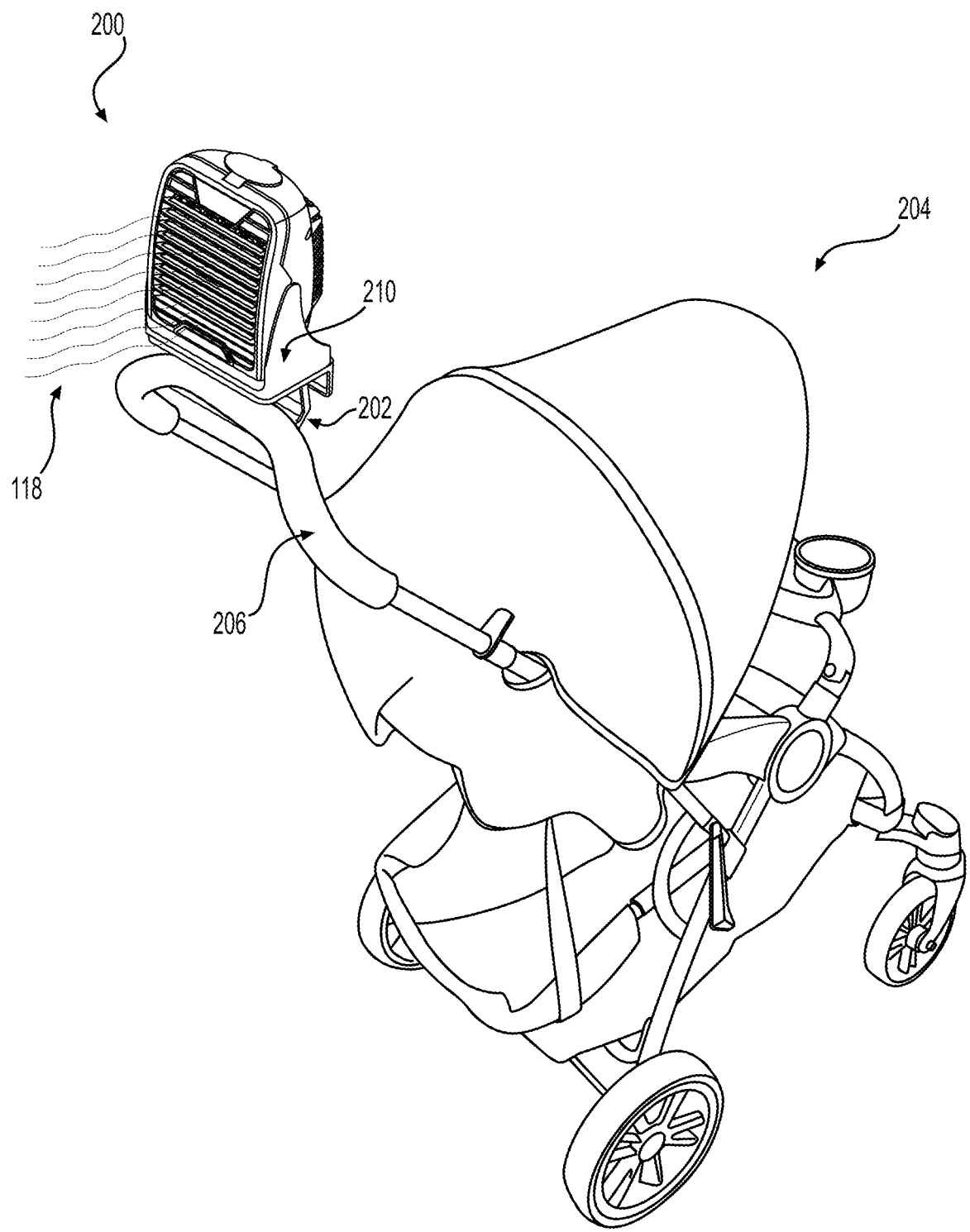
FIG. 10 is a perspective view of an exemplary embodiment of an evaporative personal air cooler attached to an exemplary stroller in accordance with aspects of the present disclosure.
Figure 11:
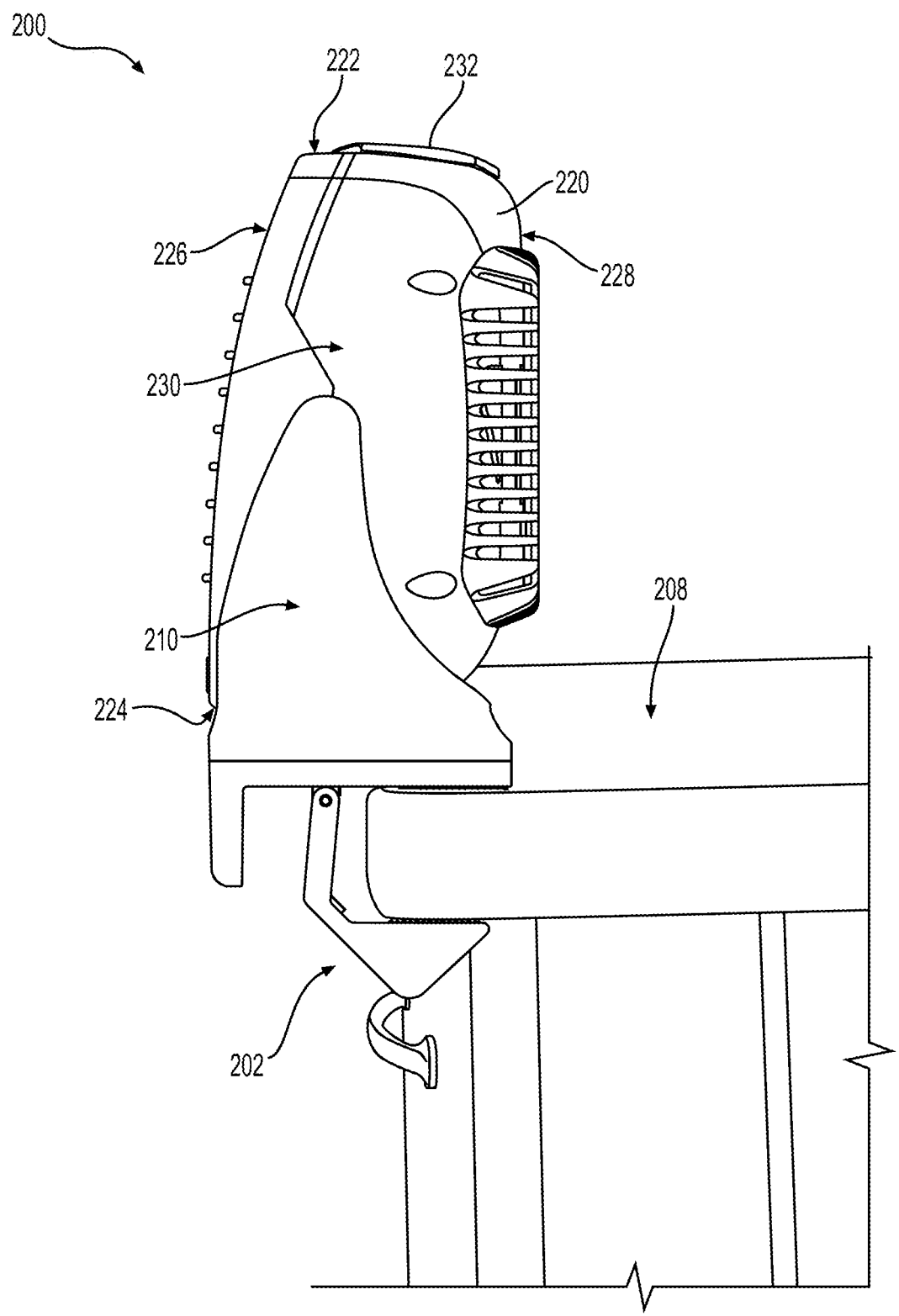
FIG. 11 is a side view of the evaporative personal air cooler in accordance with aspects of the present disclosure.

As illustrated in FIGS. 4 and 9, the housing 20 can include a container or a tank, such as the water tank 40 positioned beneath the top face 22. Liquid, such as water, can be placed into the water tank 40. For example, when the hinged lid 32 is open, liquid can be poured into the water tank 40 using a pitcher or any other desirable means. The water tank 40 can have an opening, such as the aperture 42, to release liquid from the water tank 40 into the evaporative air cooler 10. The aperture 42 can be positioned in the bottom of the water tank 40. The aperture 42 can be positioned between the v-shaped shroud 44 and the front face 26. More specifically, the aperture 42 can be positioned between the v-shaped shroud 44 and the filter structure 56.

The evaporative air cooler 10 can use a two-stage cooling for its cooling process. The first stage can incorporate a misting structure 104. The misting structure 104 can include a microporous mister, such as a mister 106. The second stage can incorporate a filter structure 56 having an evaporative sponge filter, such as filters 58 made from sponge material 60. The combination of both stages can produce an instant cooling effect and a prolonged cooling effect.

The mister 106 can provide the instant cooling effect. For example, when the evaporative air cooler 10 is powered ON, the mist 118 begins spraying from a mister 106. The power of the fan 48 can be positioned behind the mist 118 to distribute the mist 118 into the ambient air, or air, and onto the filters 58. As the mister 106 runs for a continued period of time, the filters 58 may become more wet (e.g., damp filters). The air that encounters the mist 118 can feel cooler to the user due to the evaporative cooling process. As air continually travels through the damp filter 58, the cooling effect can be prolonged. When the liquid is depleted from the water tank 40, the mist 118 may cease but the filters 58 can remain wet for a time period, allowing at least some evaporative cooling to continue.

The misting structure 104 can be located or partially located within the water tank 40. For example, the mister 106 can be assembled through the aperture 42 of the water tank 40. The misting structure 104 can be coupled to the bottom of the water tank 40, the top internal panel 110, or any other desirable location using a misting structure coupling 126. The misting structure coupling 126 can include a screw inserted through a screw hole, or any other desirable attachment. The mister 106 can be positioned upside down within the top-filled water tank 40. The mister 106 can release water downward into the interior of the evaporative air cooler 10. Liquid can be fed directly into the mister 106. The mister 106 can distribute mist 118 (e.g., moisture) to the sponge filter. By misting the filters 58 from an upper portion of the evaporative air cooler 10, the mist 118 can more effectively soak into the filters 58. The mister 106 can create an even distribution of the mist 118 to the filters 58, including to a top portion 112 of the filters 58. Walls of the water tank 40 can have angles configured to allow for an increased volume of liquid to reach the mister 106.

The mister 106 can be configured to restrict water flow from the aperture 42 when the evaporative air cooler 10 is turned OFF.

The misting structure 104 can be wired to the evaporative air cooler 10. The wires can be soldered to electrically connect the misting structure 104 to the evaporative air cooler 10, or attached in any other desirable way. The wires can be hidden in the wire compartment or any other desirable compartment within the evaporative air cooler 10.

The evaporative air cooler 10 can operate for a period of time. The period of time may depend on various factors, such as the amount of water in the water tank 40, whether the filter 58 are presoaked, whether the filters 58 were initially frozen, and a cooling mode selected based on the fan speed. In one embodiment, the evaporative air cooler 10 can operate for eight hours on the high mode, ten hours on the medium mode, and twelve hours on the low mode without refilling the water tank 40.

The evaporative air cooler 10 can include additional and/or fewer components and is not limited to those illustrated in the figures.

In an example embodiment, the evaporative air cooler 10 includes the water tank 40, the misting structure 104, the filter structure 56, and the fan 48. The water tank 40 can include the liquid inlet (e.g., via the hinged lid 32) and the liquid outlet (e.g., via the aperture 42). Liquid can enter the water tank 40 through the liquid inlet and exit the water tank through the liquid outlet. The misting structure 104 can be in liquid communication with the water tank 40. The misting structure 104 can be configured to produce mist 118 as the liquid flows through the liquid outlet. The filter structure 56 can include the plurality of filters 58 positioned substantially parallel to each other and defining air gaps 92 between the plurality of filters 58. The fan 48 can be configured to draw ambient air into the evaporative air cooler 10 and direct the ambient air through the filter structure and out of the evaporative air cooler 10. Thus, the ambient air can be cooled before exiting the evaporative air cooler 10.

The misting structure 104 can distribute the mist 118 into the ambient air and onto the plurality of filters 58. The misting structure 104 can include a mister 106. The mister 106 can be positioned adjacent the water tank 40. The mister 106 can also be positioned within the water tank 40. Liquid can flow through a top portion of the mister 106 from the water tank 40 toward a bottom portion of the mister 106. The mister 106 can project the mist 118 from the misting structure 104 into the ambient air within the evaporative air cooler 10. The mist 118 can cool the ambient air.

The misting structure 104 can produce a first volume of mist 118 when the fan 48 is at a first speed. The misting structure 104 can produce a second volume of mist 118 when the fan is at a second speed. The first volume can be larger than the second volume and the first speed can be faster than the second speed. In other words, when the fan is on high, more mist 118 can spray from the mister 106.

The evaporative air cooler 10 can include an internal assembly 74 configured to form a seal 116 with the fan 48. The seal 116 can cause the ambient air to exit the evaporative air cooler 10 with a greater force than when entering the evaporative air cooler 10. The internal assembly 74 can include at least one of the filter structure 56, and a drawer 50. The internal assembly 74 can be removably attached to the evaporative air cooler 10. The internal assembly 74 can comprises a drawer 50 attached to the outlet vent 52. The drawer 50 can include a water tray 54 angled toward the outlet vent 52. The filter structure 56 can be positioned on the water tray 54 adjacent the outlet vent 52. Any condensation or liquid in the drawer 50 can flow toward the outlet vent 52. The plurality of filters 58 can be formed from sponge-like material, such as sponge material 60. Thus, if the filter structure 56 is positioned adjacent the outlet vent 52, the plurality of filters 58 can soak up the liquid as it flows toward the outlet vent 52. If the plurality of filters 58 are at a liquid capacity, the sponge material 60 may not soak up additional liquid. The liquid in the filters 58 can be used to cool the ambient air. When the liquid in the filters 58 cools the ambient air, the liquid may evaporate from the filters 58. The filters 58 may not be at the liquid capacity after evaporation occurs and thus, can soak up more liquid.

The filter structure 56 can be configured for removal from the evaporative air cooler 10. The filter structure 56 and the plurality of filters 58 can be washable and reusable. The plurality of filters 58 can be presoaked with liquid and inserted into the evaporative air cooler 10. Presoaking the filters 58 can prolong the cooling of the evaporative air cooler 10.

The evaporative air cooler 10 can include a shroud, such as the v-shaped shroud 44, adjacent to the underside of the water tank 40. The shroud can be v-shaped or any other desirable shape.

In an example embodiment, the portable evaporative air cooler 10 for cooling ambient air includes the misting structure 104, the filter structure 56, and the fan 48. The misting structure 104 can be configured to evaporate liquid within the portable evaporative air cooler 10. The filter structure 56 can include the plurality of filters 58 configured to absorb liquid. The fan 48 can be configured to draw the ambient air into the portable evaporative air cooler 10. The ambient air can be cooled by at least one of the mist 118 and the filter structure 56. The fan 48 can direct the ambient air thorough the filter structure 56 and out of the portable evaporative air cooler 10.

The plurality of filters 58 can be formed from a sponge material 60 and positioned to define gaps, such as air gaps 92, between the plurality of filters 58. The plurality of filters 58 can be removable from the portable evaporative air cooler 10. The plurality of filters 58 can be soaked with liquid prior to entering the portable evaporative air cooler 10.

The filter structure 56 can be positioned in a drawer 50. The drawer 50 can be removable from the portable evaporative air cooler 10. The portable evaporative air cooler 10 can include a front grill, such as the outlet vent 52, with the air direction tab 72 for directing air flow and the filter drawer tab 120 for pulling the drawer 50 from the portable evaporative air cooler 10.

In an example embodiment, the personal air cooler 10 comprises the housing 20, the tank, such as the water tank 40, the misting structure 104, the filter structure 56, and the v-shaped shroud 44. The housing includes a top panel (e.g., the top face 22), a bottom panel (e.g., the bottom face 24), and side panels (e.g., the front face 26, the back face 28, and the side faces 30) that can define an interior of the personal air cooler 10. The tank can be positioned adjacent the top panel and at least one of the side panels and configured to receive, store, and release liquid. The misting structure 104 can be in fluid communication with the tank and configured to create the mist 118. The filter structure 56 can be adjacent the bottom panel and at least one of the side panels. The v-shaped shroud 44 can be positioned underneath the tank and configured to direct the mist 118 toward the filter structure 56.

The personal air cooler 10 can include the fan 48 positioned adjacent one of the side panels. The personal air cooler 10 can also include a fan cover 46 adjacent the fan 48 and configured to direct air from outside the personal air cooler 10 toward the v-shaped shroud 44. The v-shaped shroud 44 can direct mist 118 toward a top portion of the filter structure 56 and through the filter structure 56.

The filter structure 56 can include a plurality of filters 58 positioned substantially parallel to each other. Each of the plurality of filters 58 can be spaced apart a specific distance, such as 1 cm, or any other desirable distance. Thus, the plurality of filters 58 can define a plurality of air gaps 92. The plurality of filters 58 can store the mist 118. The air can be cooled by the mist 118. The cooled air can travels through the air gaps 92 and exit the personal air cooler through one of the side panels. The side panel can be the side panel adjacent the filter structure 56 and include the outlet vent 52.

FIGS. 10-19 illustrate an evaporative air cooler 200 for cooling air. The evaporative air cooler 200 can include the housing 220 with a top face 222, a bottom face 224, and four lateral faces, such as a front face 226, a back face 228, and side faces 230. The housing 220 may be formed in the shape of a cube, a cuboid, a half sphere, or any other suitable shape. The housing 220 may be formed from plastic or any other desirable material.

Figure 12:
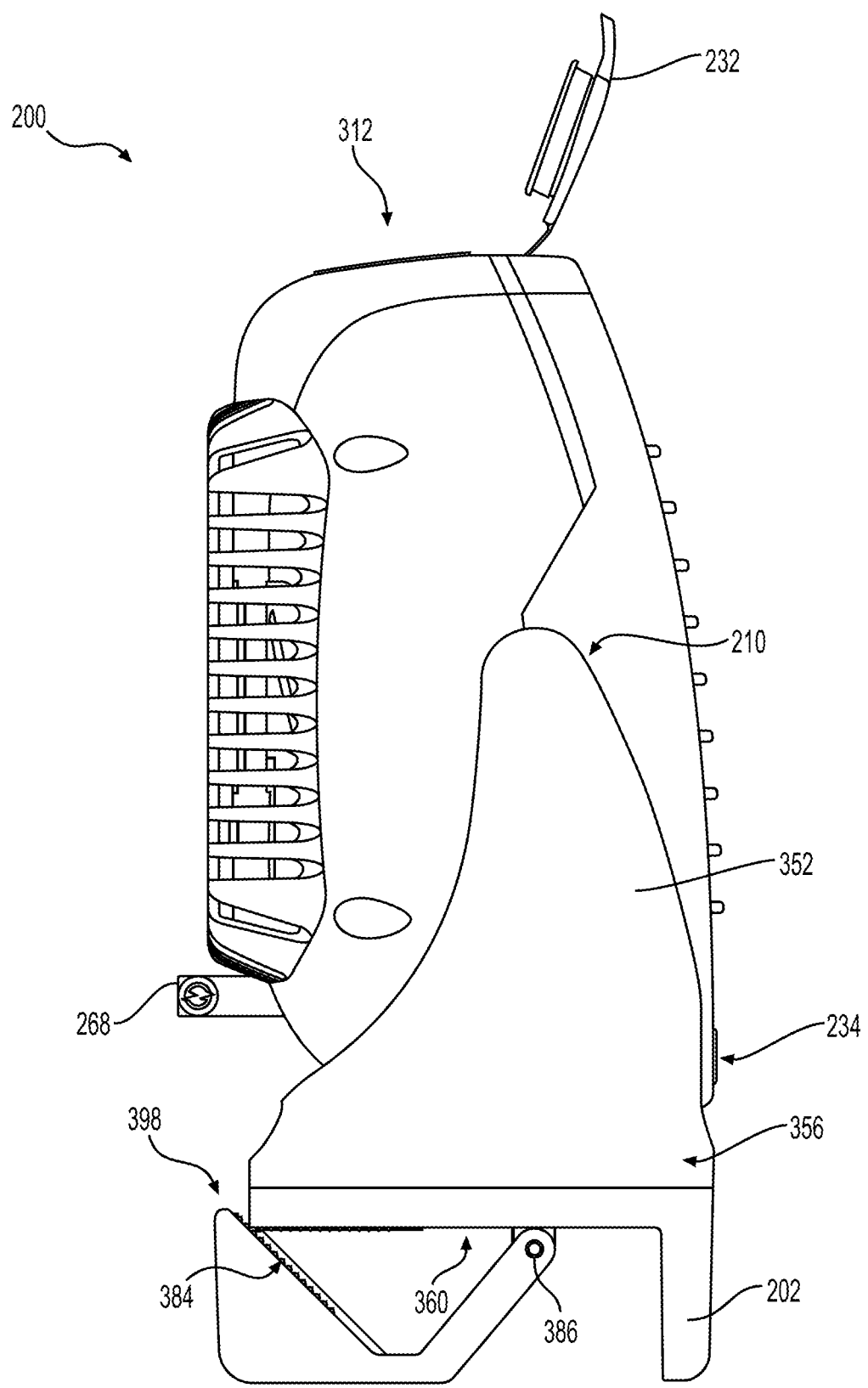
FIG. 12 is a side view of the evaporative air cooler with a lid open in accordance with aspects of the present disclosure.
Figure 13:
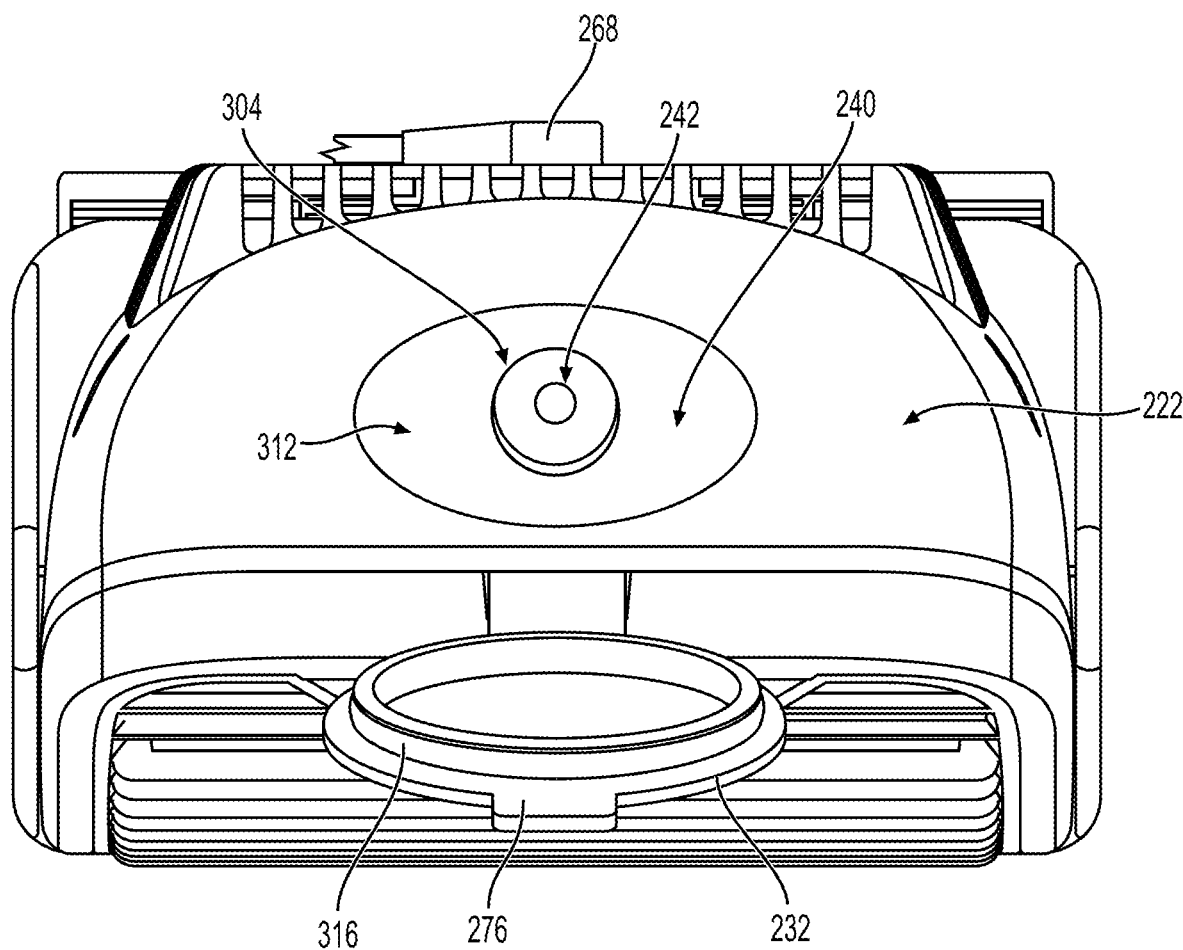
FIG. 13 is a top view of the evaporative air cooler with the lid open in accordance with aspects of the present disclosure.

The top face 222 can include a lid, such as a lid 232. FIGS. 12 and 13 illustrate the evaporative air cooler 200 with the lid 232 opened for access to the tank 240. The lid 232 can be located along a front portion of the top face 222. The lid 232 can include a lid tab 276 formed as a back portion of the lid 232 or any other desirable location. The lid 232 can be opened to allow for water to fill the tank 240. For example, a user can pull the lid tab 276 upward to open the lid 232. The lid 232 can be formed from plastic or any other desirable material. A tank opening 244 to the tank 240 can be any desirable opening. When in a closed position, the lid 232 can be configured to form a seal over the tank opening 244. The lid 232 and the tank opening 244 may be ovular or any other suitable shape or configuration.

The front face 226 can also include buttons, such as a power button 234 or any other desirable button. The power button 234 can be configured to activate (e.g., power ON), change the fan speed of the fan 248, and deactivate (e.g., power OFF) the evaporative air cooler 200. For example, when the power button 234 is first activated, an indicator light 238 can turn ON, the fan 248 can turn ON (e.g., to a high speed), and an aperture 242 positioned in the tank 240 can allow water to flow out of the tank 240 to begin the evaporative air cooling process. When the power button 234 is activated a second time, the fan speed can decrease (e.g., to a medium speed) and the aperture 242 can allow less water to flow out of the tank 240. When the power button 234 is activated a third time the fan speed can decrease (e.g., to a low speed) and the aperture 242 can allow less water to flow out of the tank 240. When the power button 234 is activated a fourth time, the indicator light 238 can turn OFF (e.g., no indicator lights 238 remain ON), the fan 248 can turn OFF, and the aperture 242 can stop the water from flowing out of the tank 240. In other words, the power button 234 can be activated to deactivate, or power OFF the evaporative air cooler 200. In one embodiment, when the power button 234 is activated (e.g. depressed) for three or more seconds, it can turn OFF the indicator light 238 and the evaporative air cooler 200.

The front face 226 can be configured to emit one or more lights, such as an indicator light 238 or any other desirable light or indicator. The front face 226 may include a semi-transparent section, such as a window 250. The indicator light 238 may comprise one or more lights, such as a blue LED light, positioned within the tank 240, or any other desirable area for illuminating the tank 240 and/or the window 250. The light can be used for ambiance, such as for a nightlight, to indicate fan speed, to indicate that the evaporative air cooler 200 is ON, or any other desirable purpose. The light may be on by default when the evaporative air cooler 200 is powered ON. The brightness of the indicator light 238 may be configured to change. For example, after the power button 234 is pressed, the light may be on a high brightness mode. When the user presses the power button 234 for a second time, the light can reduce its brightness (e.g., to a medium brightness mode). When the user presses the light button for a third time, the light can reduce its brightness (e.g., to a low brightness mode). When the user presses the power button 234 for a fourth time, the indicator light 238 can turn OFF. In one embodiment, if the power button 234 is activated for a minimum amount of time (e.g., three seconds), an illumination setting can be selected and/or locked.

The power indicator light 236 may be used to indicate a that the evaporative air cooler 200 is low on battery, charging, or fully charged; whether the filter 258 should be replaced; or any other desirable indication. The power indicator light 236 may display a blinking light or a solid light. The power indicator light 236 may display different light colors, such as green, red, amber, or any other desirable color.

Figure 15:
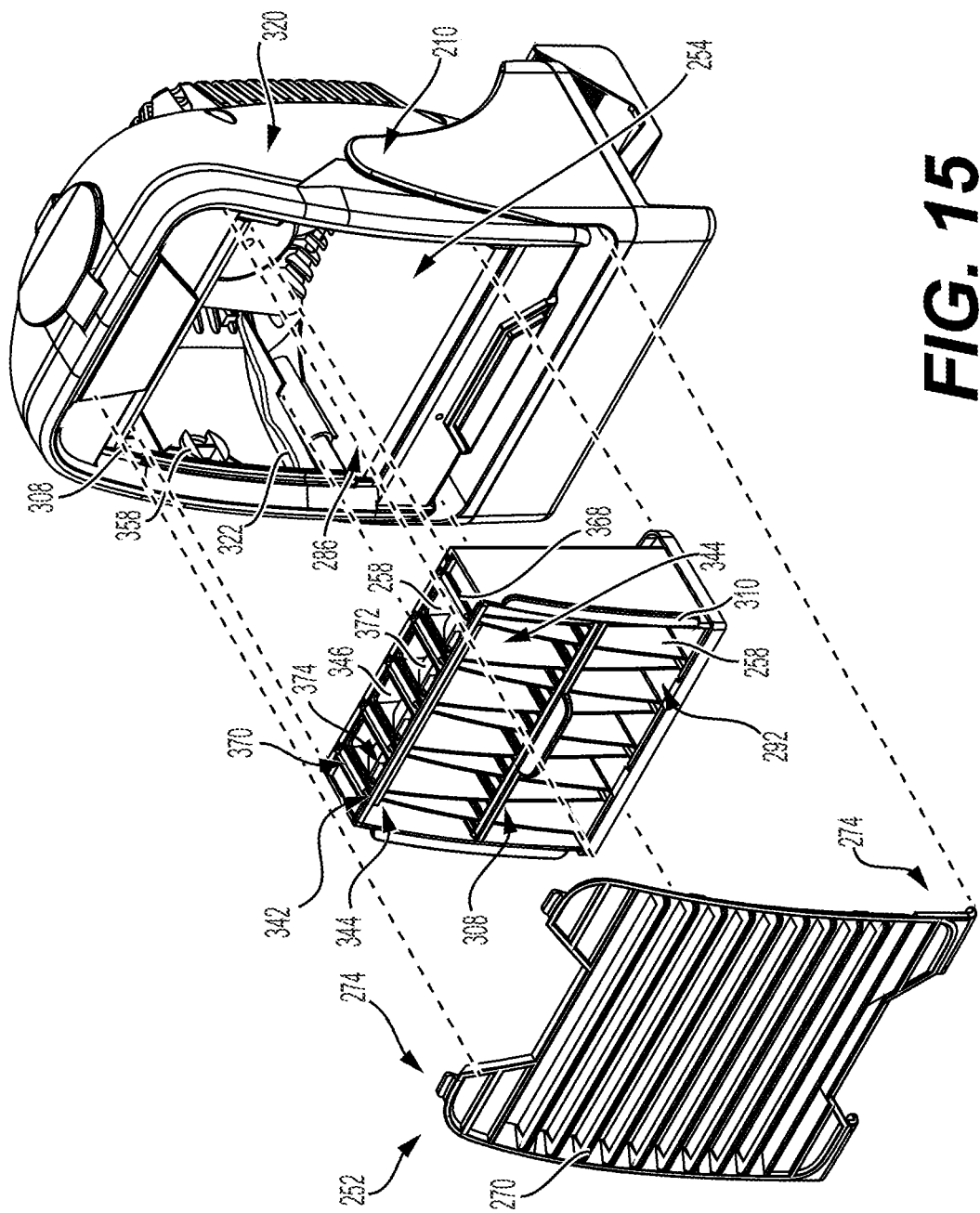
FIG. 15 is an exploded view of the evaporative air cooler in accordance with aspects of the present disclosure.
Figure 16A:
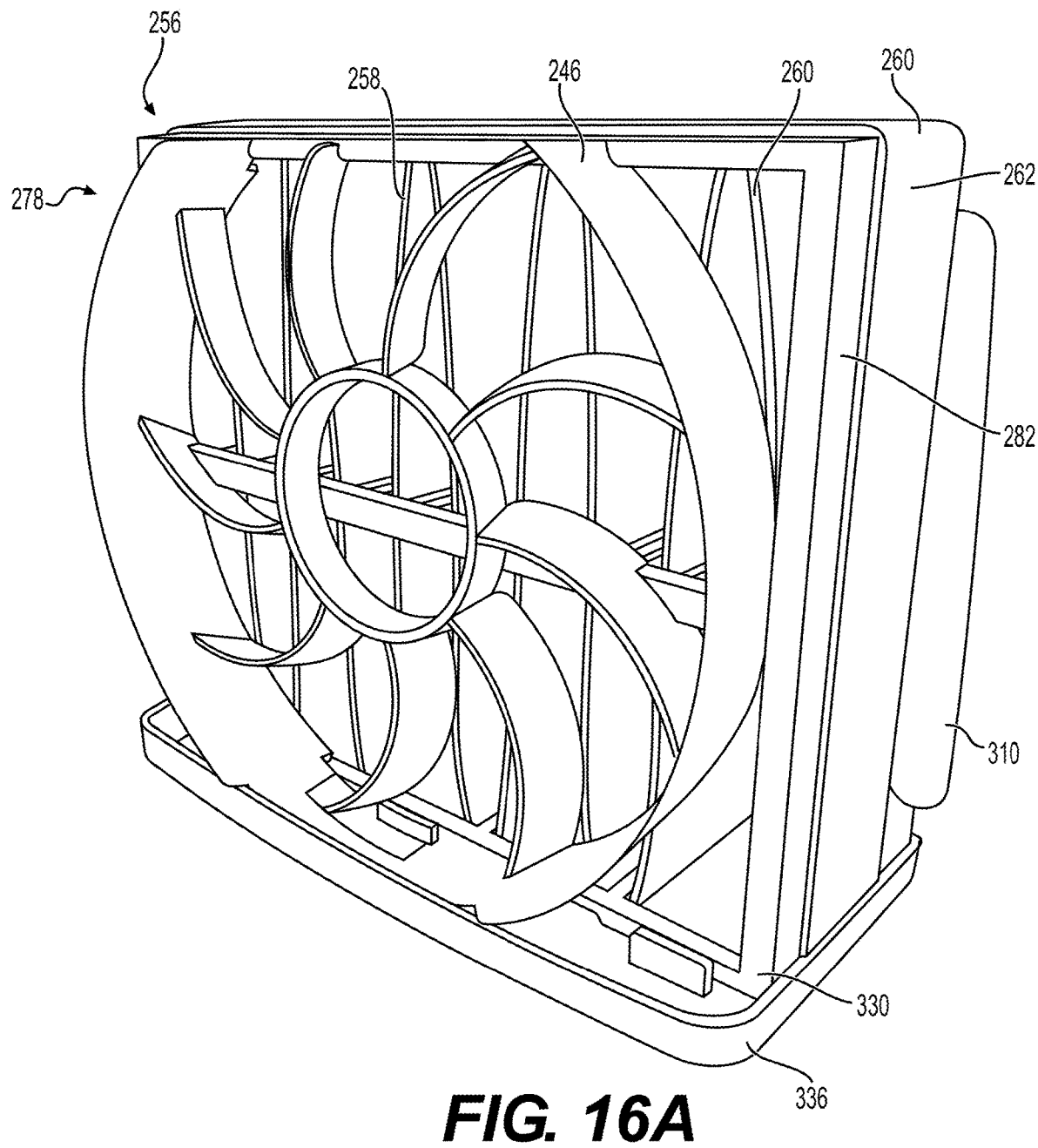
FIGS. 16A-C are a views of a filter structure of the evaporative air cooler in accordance with aspects of the present disclosure.
Figure 16B:
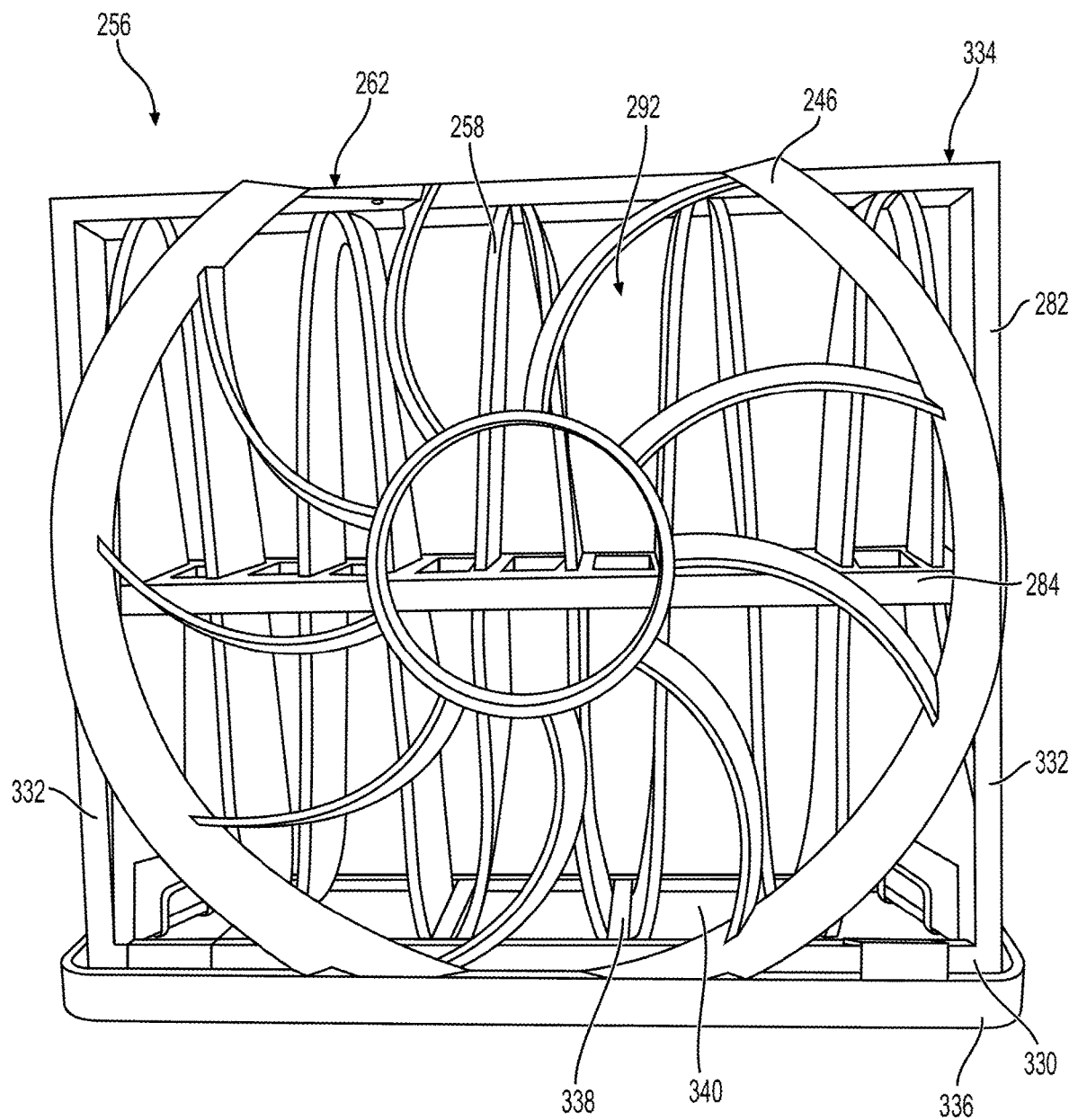
Figure 16C:
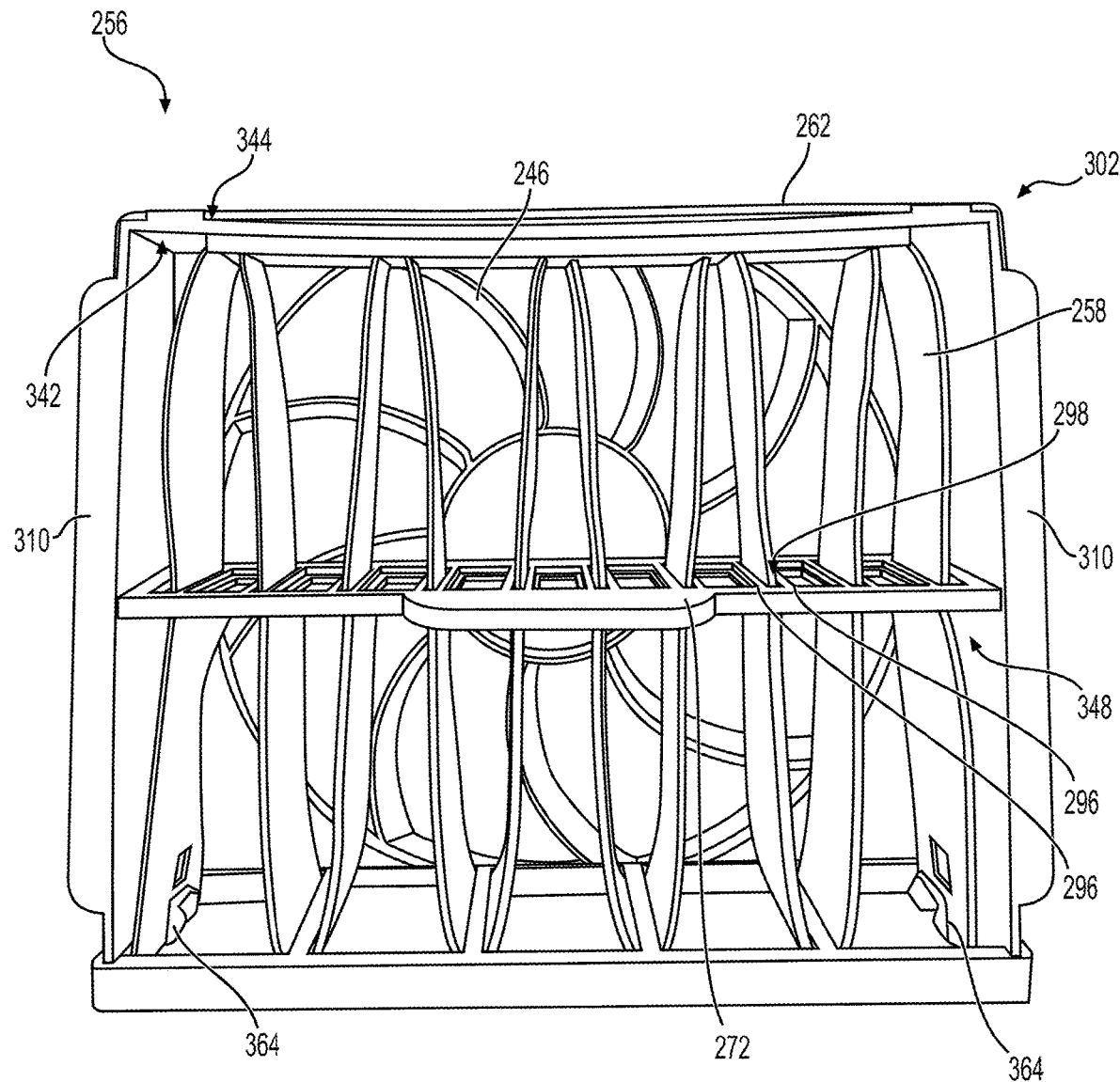

The evaporative air cooler 200 can include the housing 220. The housing 220 can define an interior 254 of the evaporative air cooler 200. The interior 254 can be configured to receive a filter structure 256. The filter structure 256 can include a filter frame 282. The filter frame 282 can be formed from plastic or any other desired material. The filter structure 256 may be square, rectangular, or any other desired shape. The filter frame 282 can include a 330 bottom wall, two side walls 332, and a top wall 334. As shown in FIGS. 15 and 16A-C, the bottom wall 330 can be coupled to a base 336. The bottom wall 330 can be configured to lock into the base 336. The bottom wall 330 can include bottom bars 338 that define bottom openings 340. FIG. 15 illustrates the filter structure 256 with the second filter 262 removed. The top wall 334 can include an upper top wall 342 and a lower top wall 344. The upper top wall 342 and the lower top wall 344 can be configured to lock together. The upper and lower top walls 342, 344 can define top openings 346. The upper top wall 342 can comprise one or more slits 370 between the top openings 346. The lower top wall 344 can comprise one or more bars 368. Each of the one or more bars 368 can be positioned within one of the one or more slits 370. The lower top wall 344 can comprise one or more tabs 372. Each of the one or more tabs 372 can be positioned within one of the top openings 346. Each of the one or more tabs 372 can comprise a snap 374. The snap 374 can be configured to overlap the edge of the top opening 346. The snap 374 can be configured to secure the upper and lower top walls 342, 344 into a locked position. The upper and lower top walls 342, 344 can couple together via snaps or any other suitable means. The tabs 372 can be configured to angle downward toward a center portion of the filter structure 256. The tabs 372 can be configured to direct the mist 118, water, and the like toward the back of the filter structure 256. When the filter structure 256 is within the interior 254 of the evaporative air cooler 200, the tabs 372 can direct the water, the mist 118, and the like toward the fan 248.

The filter structure 256 can comprise one or more filters, such as filters 258, 262. The filter 258 can be positioned through one of the bottom openings 340 from one side of one of the bottom bars 338 to other side of that bottom bar 338. The filter 258 can be positioned around the top portion of one of one of the top bars 368. When the upper and lower top walls 342, 344 are in a locked position, the filter 258 and the top bars 368 are positioned within the slits 370. The filter 258 can include this configuration for each of the bars 338, 368 to form a zig-zag configuration of the filter 258. Each of the ends of the filter 258 can couple to one of the side walls 332, the bottom wall 330, or any other suitable component. For example, the side walls 332 can include hooks 364 and each of the ends of the filter 258 can include an opening configured for insertion of one of the hooks 364.

The filter structure 256 can include a filter holder 284. The filter holder 284 can be coupled to the filter frame 282. For example, the filter holder 284 can be snapped to each of the side walls 332 of the filter frame 282. The filter holder 284 can be coupled to the filter frame 282 at a middle portion of each of the side walls 332. The filter structure 256 can be configured for removal from the interior 254. The filter holder 284 can include a pull tab 272. The pull tab 272 can be positioned on a front side 348 of the filter structure 256. The pull tab 272 can be configured for a user to pull the pull tab 272 to remove the filter structure 256 from the interior 254 of the housing 220 and/or to insert the filter structure 256 into the interior 254. In this example, the user can remove a grill 252 from the housing 220 and pull the pull tab 272 to remove the filter structure 256. The filter structure 256, including the filters 258, 262 can be reusable. The filter structure 256 and the filters 258, 262 can be washed. The filter structure 256 and the filters 258, 262 can be replaced.

The interior 254 can include filter structure stoppers 308. The filters structure stoppers 308 can be coupled or formed into interior portions of the side faces 230 and/or the back face 228. The filter structure stoppers 308 can be formed from plastic or any other desired material. The filter structure stoppers 308 can be configured to position the filter structure 256 into a desired position within the interior 254. In other words, the filter structure stoppers 308 stop and/or generally hold the filter structure stoppers 308 into place adjacent to, but not touching the fan 248. As illustrated in FIGS. 15 and 16A-C, the filter structure 256 can comprise filter structure stopper tabs 310 coupled to or formed into the front side portions of the filter structure 256. The filter structure stopper tabs 310 can be formed from plastic or any other desired material. The filter structure stopper tabs 310 can be configured to position the filter structure 256 into a desired position within the interior 254. In other words, the filter structure stopper tabs 310 stop and/or generally hold the filter structure stoppers 308 into place adjacent to, but not touching the fan 248.

The filter holders 284 can include bars 296 that define openings, such as slits 298. The bars 296 of the filter holders 284 extend from one side of the filter holder 284 to the opposing side of the filter holder 284. The filter 258 can be positioned through each of the filter holders 284. The filter holder 284 can provide additional support for securing the filter 258 to the filter frame 282. The filter holder 284 can further assist in maintaining the configuration of the filter 258 in the zig-zag formation when the filter 258 is dry, damp, wet, or a combination thereof.

A second filter 262 can be coupled to at least a portion of a perimeter 302 of the filter structure 256. In one embodiment, the second filter 262 is positioned adjacent the outer perimeter 302 of the top wall 334 and the side walls 332. Each of the ends of the second filter 262 can be coupled to the a bottom portion of each of the side walls 332. For example, the side walls 332 can include hooks 364 and each of the ends of the second filter 262 can include an opening configured for insertion of one of the hooks 364. The second filter 262 can be configured to absorb the mist 118. The second filter 262 can be formed from the same material as the filter 258, such as the sponge material 260, or any other suitable material. The second filter 262 can be in fluid communication with the filter 258. The filter 258 can absorb the liquid and/or mist 118 absorbed by the second filter 262. For example, portions of the filter 258 can be positioned through the top wall 334 of the filter structure 256 and are adjacent to the second filter 262 positioned adjacent to the top wall 334 (e.g., along the perimeter 302 of a portion of the filter frame 282). The filters 258, 262 may be touching or in close proximity to each other. The second filter 262 can be coupled to the two side walls 332, the bottom wall 330, any other suitable wall, or combination thereof. In one embodiment, the filters 258, 262 are the same filter. In another embodiment, the second filter 262 is not included in the filter structure 256.

The filter 258 can be configured in a zig-zag formation and define air gaps 292. The filter 258 can be configured to store liquid, such as mist 118, water, any other suitable liquid, or combination thereof. The filter is configured to absorb the mist 118 from the mister, absorb liquid from being pre-soaked, store liquid via being frozen, or any other suitable means to absorb or store liquid. The air gaps 292 are configured to allow for air to flow through the filter structure 256, contact the filters 258, 262 to cool the air, and exit the interior 254.

The filter structure 256 can include a fan cover 246. The fan cover 246 can be coupled to a back side 278 of the filter structure 256. The fan cover 246 can be positioned adjacent the fan. The fan cover 246 can be configured to direct air from the fan toward the filter structure 256. The fan cover 246 can be configured to form a suction with the fan, such as to provide additional force in directing the air from outside of the housing 220 through the fan cover 246, the filter structure 256, and the grill 252. In this way, the fan cover 246 can be configured to direct air flow through the interior 254 of the evaporative air cooler 200.

The fan 248 can be positioned adjacent one of the sides of the housing 220, such as the back face 228. The fan 248 can be configured to draw the air into the evaporative air cooler 200, such as through grate openings 300 in the back face 228 of the housing 220. The air can be cooled by at least one of the mist 118 and the filters 258, 262. The fan 248 can include blades 264. The fan 248 may include four blades 264 or any other suitable number of blades. The fan 248 may include a motor 266. The motor 266 can be used to control the fan 248 to rotate the blades 264. The motor 266 can rotate the blades 264 at various speeds. The speed of rotation of the blades 264 can change the amount (e.g., volume) of air and the speed for which the air flows through the filter structure 256 and out of the interior 254 of the evaporative air cooler 200. The evaporative air cooler 200 can include different levels of speed, each of which can be configured to direct air. A higher level may direct a larger amount of air at a first speed. A mid-range level may direct a mid-range amount of air at a second speed. A lower level may direct a lower amount of air at a third speed. The first speed may be greater than the second speed. The second speed may be greater than the third speed. The evaporative air cooler 200 can be configured to have predefined speeds, a variable speed, or any combination thereof.

The fan 248 can be wired to the evaporative air cooler 200. The wire 322 can be soldered to electrically connect the fan 248 to the evaporative air cooler 200, or attached in any other desirable way. The wire 322 can be hidden in a wire compartment or any other desirable compartment within the evaporative air cooler 200.

Figure 18:
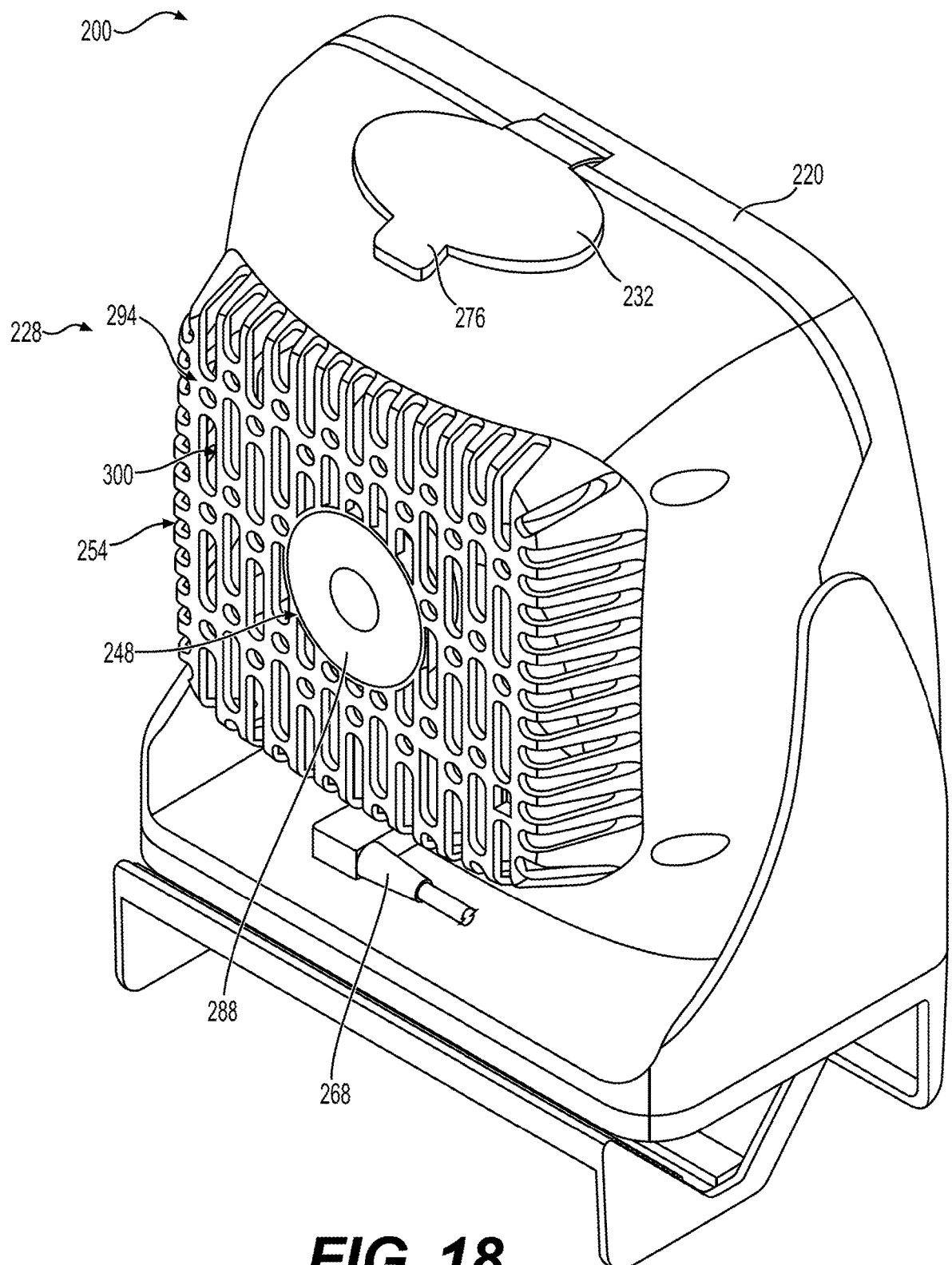
FIG. 18 is a back perspective view of an evaporative air cooler in accordance with aspects of the present disclosure.
Figure 19:
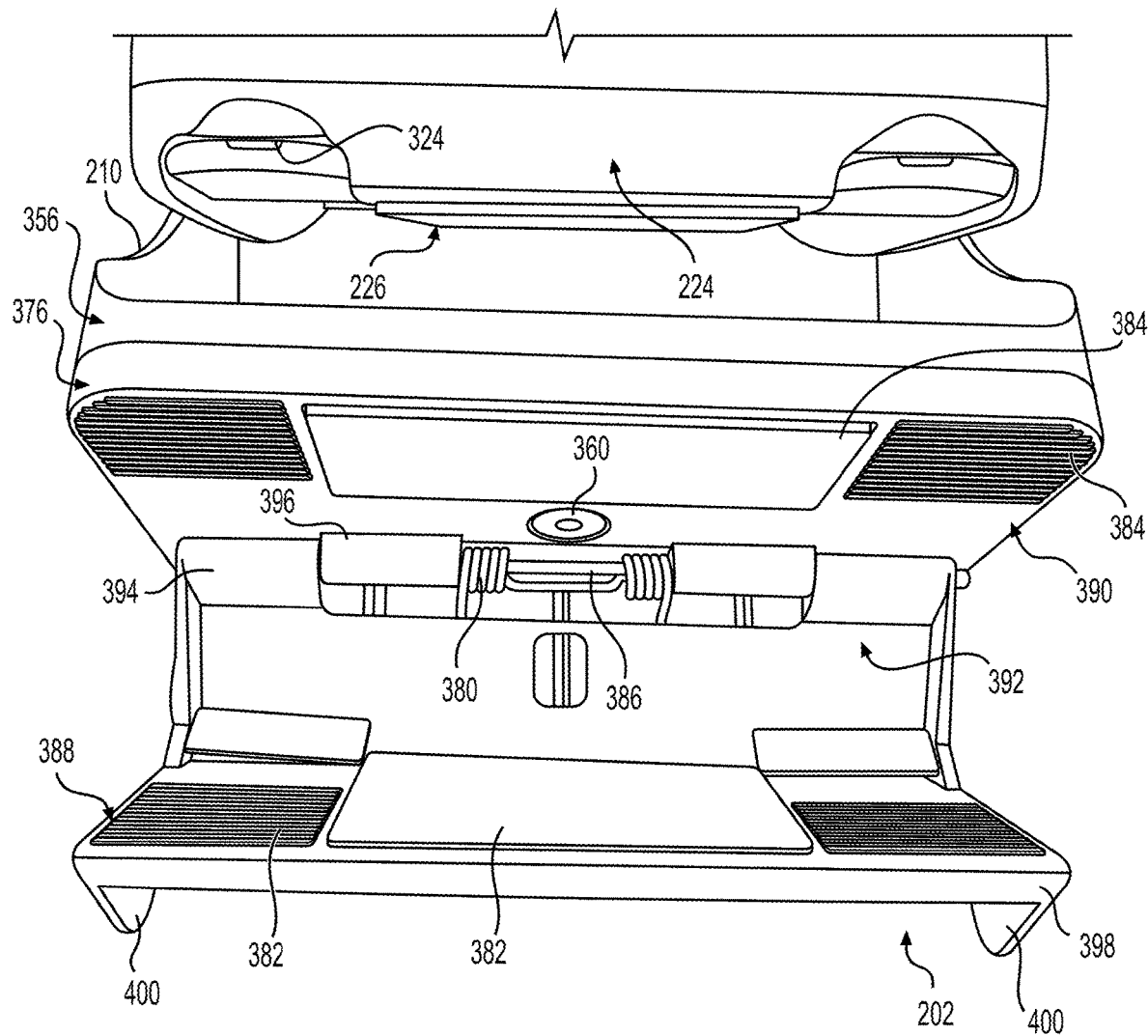
FIG. 19 is a perspective view of a clip of an evaporative air cooler in accordance with aspects of the present disclosure.

As illustrated in FIG. 18, the back face 228 can include a grate 294 defining grate openings 300. The grate openings 300 can be configured throughout the grate 294. The grate 294 can be a portion of the back face 228, such as a central portion of the back face 228. The grate 294 can be a rectangle, a square, a circle, an oval, or any other suitable shape. The grate openings 300 can include one or more shapes (e.g., circular, rectangular, ovular, any other suitable shape, or combination thereof). Air, such as ambient air, can enter from outside of the housing 220 through the grate openings 300 of the grate 294 and into the interior 254 of the evaporative air cooler 200. The grate 294 may be configured to protrude from the back face 228. The fan 248 can be coupled to the back face 228. More specifically, the grate 294 may include a fan coupling 288 to couple to the fan 248. The protrusion of the grate 294 from the back face 228 can be configured for housing the fan 248.

The evaporative air cooler 200 can be powered by a power source, such as a battery or any other suitable power source. The battery can be a rechargeable battery, such as a Lithium-ion battery (LIB) or any other rechargeable power source. The evaporative air cooler 200 can include a charging port (not shown) to charge the rechargeable battery. The charging port can be disposed on the back face 228 or any other desirable location on the evaporative air cooler 200. The charging port (not shown) can be configured to receive the charger 268. The evaporative air cooler 200 can operate using a rechargeable battery and/or when plugged into an electrical outlet.

Figure 14:
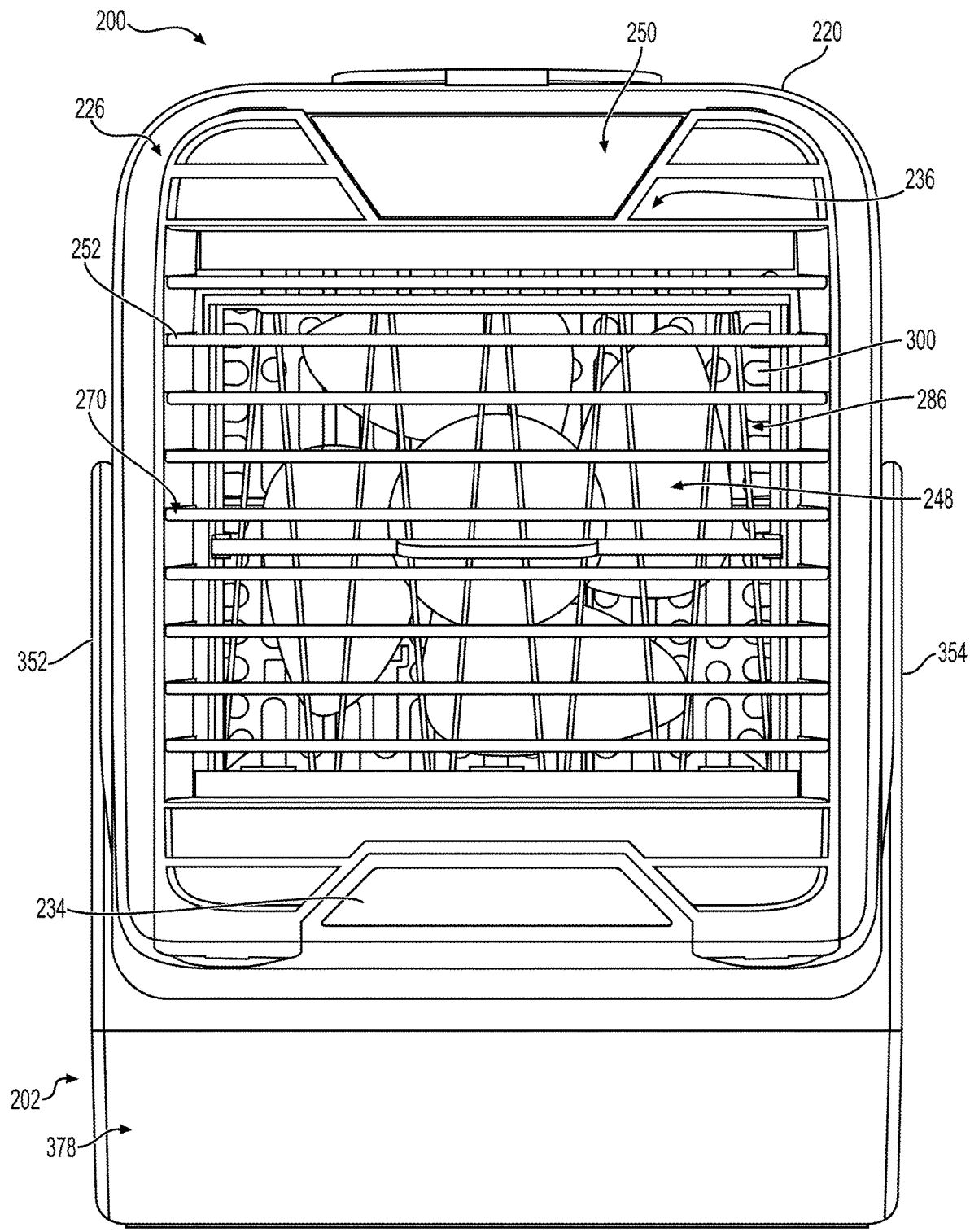
FIG. 14 is a front view of the evaporative air cooler in accordance with aspects of the present disclosure.
Figure 17:
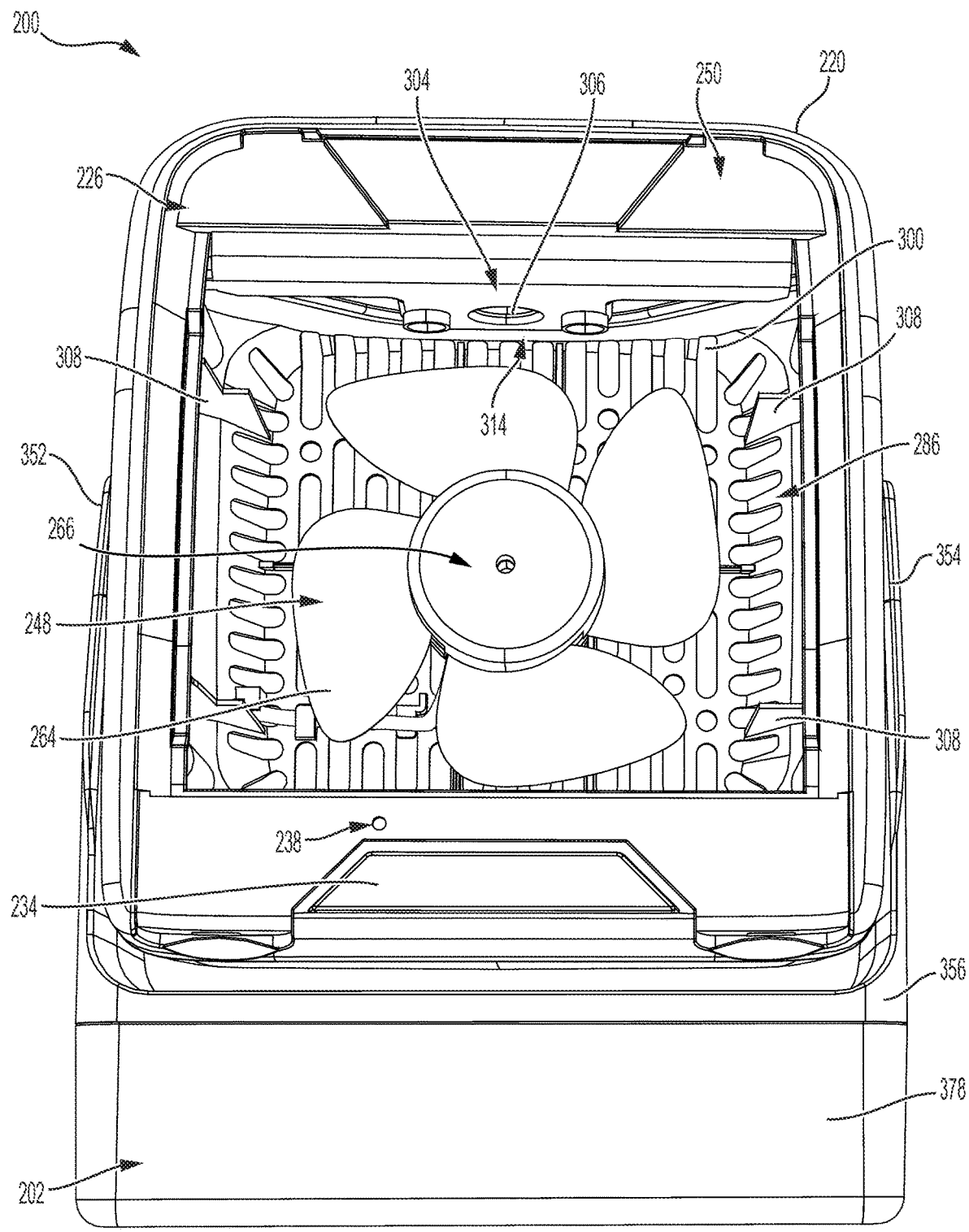
FIG. 17 is a front perspective view of the evaporative personal air cooler after the internal assembly is removed in accordance with aspects of the present disclosure.

As illustrated in FIGS. 14 and 17, the front face 226 of the housing 220 may define an opening, such as a front opening 286. The grill 252 can be coupled to the front face 226 to cover the front opening 286. The grill 252 may include grill tabs 274 configured to secure the grill 252 to the housing 220. The grill tabs 274 may be couple to or formed into the grill 252. The grill tabs 274 may be positioned in each of the corners of the grill 252. The grill 252 can be configured to removably couple to the front face 226 of the housing 220. Each of the grill tabs 274 can be inserted into one of the openings 324 in the housing 220. The openings 324 can be located in the bottom face 224, the frong face 226, or any other desired location in the housing 220. When coupled to the housing 220, the grill 252 can provide a front side to the housing 220. The grill 252 can include vents 270 (e.g., bars). The vents 270 may be configured in a horizontal configuration, an angled configuration, any other suitable configuration, or combination thereof. The vents 270 may be stationary. The vents 270 can be configured to rotate. Each of the vents 270 may be aligned parallel to one another such that the vents 270 are configured to allow for air to pass through the vents 270.

The evaporative air cooler 200 can include an angling member 210. The angling member can be coupled to the housing 220. The angling member can include arms 352, 354 and a base 356. A first arm can be rotatably coupled to one of the side faces 230 of the housing 220. A second arm 354 can be rotatably coupled to the opposing side face 230. In one embodiment, the first and second arms 352, 354 couple to a center portion of the side faces 230. The arms may be coupled to the sides via a coupling 358, such as a ratchet system or any other desired rotatable attachment. The angling member can be configured to rotate the housing 220. The angling member can rotate the housing 220 to position the housing 220 in an angle that a user desires. The angling member can be configured to rotate the housing 220 in a vertical direction. The angling member 210 can be configured to rotate the housing 220 360 degrees. The angling member 210 can maintain a position, or angle, of the housing 220 relative to the angling member 210. For example, if a user would like the evaporative air cooler 200 to blow cool air toward the user's face, the user may rotate the housing 220 upward to direct the cooled air upward. Similarly, the user can rotate the housing 220 downward to direct the cooled air downward. The arms 352, 354 can be coupled to the sides such that the housing 220 is stationary and cannot be rotated about the arms.

The first and second arms 352, 354 can protrude from either side of the base 356. The first and second arms 352, 354 can be formed with the base 356 or coupled to the base 356. The base 356 can be formed from plastic or any other suitable material. The base 356 can be coupled to a clip 202 via a coupling 360, such as a ratchet system or any other desired rotatable attachment. The coupling 360 can be configured to rotate housing 220 via the base 356 in either direction (e.g., to the right or to the left) 360 degrees or any other desirable degree rotation.

The evaporative air cooler 200 can include a fastener, such as the clip 202. The clip 202 can be a device that is rotatable or worked by a spring 380 for holding an object or objects together or in place. For example, the clip 202 can be configured to removably couple the evaporative air cooler 200 to the handle 206 of the stroller 204, the countertop 208, a desk, a table, or any other suitable object. The clip 202 may include grips 382, 384 on one or more components of the clip 202. For example, the grip 382 may be configured on a grip side 388 of the clip 202 and the grip 384 may be configured on a grip side 390 of a clip base 376. The grips 382, 384 can be configured to more securely attach the evaporative air cooler 200 to the object. The grips 382, 384 can be formed from rubber, plastic, or any other desired material. The grips 382, 384 may be formed as ridges and/or a smooth surface. The smooth surface may be configured to protect the object to which the clip 202 attaches to, such that the clip 202 does not damage (e.g., scrape, scratch, etc.) the object.

The clip 202 can be coupled to the clip base 376 via a coupling 392. The coupling 392 can comprise a rod 386 configured for insertion into rod holders 394, 396. The rod holders 394 can be coupled to or formed at the end of one of the sides of the clip. The rod holders 396 can be coupled to or formed on the grip side 390 of the base. Each of the rod holders 394, 394 can define an opening for the rod 386 to insert through. A spring 380 can define an opening be configured for the rod 386 to insert through. The spring 380 can provide tension to the clip 202 relative to the clip base 376. In a closed position, the clip 202 may be configured such that one end of the clip 202 (e.g., a grip end 398) extends further than the clip base 376. The grip end 398 is configured for a user to rotate the clip 202 by exerting force on the grip end 398 to rotate the clip 202 about the coupling 392. The user can open the clip 202 for an object to be inserted into the clip 202. When the user releases the clip 202, the tension provided by the spring 380 couples the clip 202 to the object and secures the evaporative air cooler 200 into the desired place.

The clip 202 can include one or more support members 400. The one or more support members 400 can be configured on opposing sides of the clip 202, along the clip 202, or any other desired position. The one or more support members 400 can be configured to support the evaporative air cooler 200 in an upright position when the clip 202 is in a closed position. In other words, the the one or more support members 400 support the evaporative air cooler 200 so that the evaporative air cooler 200 does not easily tip over when it is placed on a surface. Similarly, the clip base 376 may comprise a front face 378 configured to provide support for the evaporative air cooler 200 when the evaporative air cooler 200 is placed on a surface (e.g., with the clip in the closed position). The front face 378 may protect components of the coupling 392 from being damaged. For example, the front face 378 can stop the clip 202 from being rotated too far such that the spring 380 is overextended.

The clip 202 can be coupled to the angling member 210. Specifically, the clip base 376 can be coupled to the base 356 of the angling member. 210 The clip base 376 can be rotatably coupled to the base 356, such as to a bottom portion of the base 356. The clip base 376 may be coupled to the base 356 via the coupling 360, such as a ratchet system or any other desired rotatable attachment. The base 356 can be configured to rotate the housing 220 about the clip base 376 in a horizontal direction. The base 356 can rotate about the clip base 376 in either direction horizontally 0-360 degrees. For example, a user can attach the evaporative air cooler 200, via the clip 202, to the countertop 208. The user can rotate the housing 220 of the evaporative air cooler 200 horizontally, via the base 356, toward the user. The user can further rotate the housing 220 vertically, via the angling member 210, toward the user. In this way, when the evaporative air cooler 200 is turned on, the cooled air can be directed toward the user. In another embodiment, the housing 220 can be coupled to the angling member 210 and the base 356 can be coupled to the clip base 376 such that the housing 220 is stationary and cannot be rotated in horizontal and/or vertical directions.

As illustrated in FIGS. 13 and 14, the evaporative air cooler 200 can include a tank 240. The tank 240 can be positioned adjacent to a top face 222 of the housing 220. Portions of the interior of the top face 222, the front face 226, the back face 228, and the side faces 230 of the housing 220 may form portions of the tank 240. For example, the tank 240 can be configured within the housing 220 such that the top portion of the tank 240 is an underside of the top face 222 of the housing 220. The tank 240 can include a front side and a bottom side coupled to the housing 220. The front side and the bottom side of the tank 240 may comprise the window 250. A light, such as the power indicator 236 can be disposed adjacent to the bottom side of the tank 240, or any other desired location. The bottom side of the tank 240 and the front portion of the tank 240 may comprise the window 250 and be configured to emit light produced by the power indicator 236 throughout the tank 240. The power indicator 236 may also be configured to emit light into the interior 254 and toward the outside of the evaporative air cooler 200.

The tank 240 can include a liquid inlet 312 and a liquid outlet 314. The top portion of the housing 220 can define an opening, such as liquid inlet 312. The liquid inlet 312 can be ovular, circular, or any other desirable shape. The bottom portion of the tank 240 can define an opening, such as the liquid outlet 314. The liquid outlet can be ovular, circular, or any other desirable shape. The liquid outlet 314 can be positioned in the bottom of the tank 240. The liquid outlet 314 can be positioned in a central location in the bottom of the tank 240. The liquid outlet can be positioned adjacent a filter structure 256. The liquid outlet 314 can be configured to receive a misting structure 304 comprising a mister 306. Liquid, such as water, can enter the tank 240 through the liquid inlet 312 and exit the tank 240 through the liquid outlet 312. In response to the liquid flowing through the liquid outlet 314, the mister 306 can be configured to create, from the liquid, a mist in the interior 254 of the evaporative air cooler 200.

As illustrated in FIGS. 12 and 13, a lid 232 can be coupled to the top face 222, or any other suitable portion of the housing 220. The lid 232 can be coupled to the top face 222 via a hinge, a cord, or any other suitable attachment. A portion of the lid 232 can be configured to fit within the liquid inlet 312. For example, if the liquid inlet 312 is an oval shape, the lid 232 can be a slightly smaller oval shape so as to fit within the liquid inlet 312 and form a seal 316 when the lid 232 is in a closed position. The lid 232 may include an ovular seal 316 to form a seal with the liquid inlet 312 such that liquid remains in the tank 240. The lid 232 may be formed from plastic or any other desirable material. The seal 316 may be formed from rubber or any other desirable material. The tank 240 can be configured to receive, store, and release liquid. For example, when the lid 232 is open (see FIG. 13), liquid can be poured into the tank 240 using a pitcher, a faucet, a water bottle, or any other desirable filling means.

The mister 306 can be positioned adjacent the tank 240. The mister 306 can be coupled to the liquid outlet 314. The mister 306 can be in fluid communication with the tank 240. Liquid can flow through a top portion of the mister 306 from the tank 240 toward a bottom portion of the mister 306. The mister 306 can be configured to create the mist 118 from the liquid stored in the tank 240. The mister 306 can distribute the mist 118 into the air into the interior 254 of the evaporative air cooler 200 and onto a filter, such as the second filter 262. The mist 118 can cool the air within the interior 254.

When the evaporative air cooler 200 is operating, the mister 306 can produce mist 118. For example, the mister 306 can be configured to create a first volume of mist 118 when a fan 248 is at a first speed. The mister 306 can be configured to create a second volume of mist 118 when the fan 248 is at a second speed (the aperture 242 of the misting structure 304 can allow less water to flow out of the tank 240). The mister 306 can be configured to create a third volume of mist 118 when the fan 248 is at a third speed. The first volume can be greater than the second volume and the first speed can be faster than the second speed. In other words, when the fan 248 is on high, a higher volume of mist 118 can spray from the mister 306. Similarly, the first and second volumes can be greater than the third volume and the first and second speeds can be faster than the third speed. The evaporative air cooler 200 can have a button, such as the power button 234, for controlling the speed of the fan 248. For example, when the power button 234 is engaged a first time, the fan 248 can operate at the first speed. When the power button 234 is engaged for a second time, the fan 248 can operate at the second speed. When the power button 234 is engaged for a third time, the fan 248 can operate at the third speed. When the power button 234 is engaged for a fourth time, the fan 248 can turn off (i.e., to end operation of the fan 248). The evaporative air cooler 200 may have any number of speeds and is not limited to those described in this disclosure. The evaporative air cooler 200 can have a light (e.g., the power indicator 236), such as an LED light or any other desired light, to indicate that the evaporative air cooler 200 is operating. The power indicator 236 can be configured to indicate the speed of operation.

The evaporative air cooler 200 can include a safety interlock 320. The safety interlock 320 can be configured to prevent operation of the evaporative air cooler 200. For example, if at least one of the grill 252 and the filter structure 256 is removed from the housing 220, the safety interlock 320 can shut off operation of the evaporative air cooler 200. The safety interlock 320 can function as a safety feature such that a user does not touch the blades of the fan while the fan is spinning in operation.

In one embodiment, the evaporative air cooler 200 for cooling air comprises the housing 220, the tank 240, the mister, the filter structure 256, the fan, and a clip 202. The housing 220 defines the interior of the evaporative air cooler 200. The tank 240 is positioned adjacent to the top portion of the housing 220. The tank 240 is configured to receive, store, and release liquid. The mister is configured to be in fluid communication with the tank 240. The mister is configured to create a mist 118 from the liquid. The mist 118 can be created in the interior. The filter structure 256 includes a filter. The filter is configured to absorb the mist. The fan is configured to draw the air into the interior. The air is cooled by at least one of the mist 118 and the filter. The fan directs the air through the filter structure 256 and out of the evaporative air cooler 200. The clip 202 coupled to the housing 220. The angling member coupled to the housing 220. The angling member is configured to rotate the housing 220. The angling member is configured to rotate the housing 220 in at least one of a vertical direction and a horizontal direction. The angling member is configured to rotate the housing 220 0-360 degrees in a vertical direction. The angling member is configured to rotate the housing 220 0-360 degrees in a horizontal direction. The clip 202 is configured to removably couple the evaporative air cooler 200 to an object. This embodiment may have fewer or additional features and is not limited to this configuration.

In another embodiment, the evaporative air cooler 200 for cooling air comprises the housing 220, the tank 240, the mister, the filter structure 256, the fan, and a clip 202. The housing 220 defines the interior of the evaporative air cooler 200. The tank 240 is positioned adjacent to the top portion of the housing 220. The tank 240 is configured to receive, store, and release liquid. The mister is configured to be in fluid communication with the tank 240. The mister is configured to create a mist 118 from the liquid. The mist 118 can be created in the interior. The filter structure 256 includes a filter and a second filter. The filter and the second filter are configured to absorb the mist. The filter is configured in a zig-zag formation and defines air gaps. The second filter is coupled to at least a portion of a perimeter 302 of the filter structure 256. The second filter is in fluid communication with the filter. The fan is configured to draw the air into the interior. The air is cooled by at least one of the mist, the filter, and the second filter. The fan directs the air through the filter structure 256 and from the interior. The clip 202 coupled to the housing 220. This embodiment may have fewer or additional features and is not limited to this configuration.

Consistent with the above disclosure, the examples of systems and method enumerated in the following clauses are specifically contemplated and are intended as a non-limiting set of examples.

Clause 1. An evaporative air cooler for cooling ambient air, comprising:
- a housing with a top panel, a bottom panel, and side panels defining an interior of the evaporative air cooler;
- a tank positioned adjacent the top panel and at least one of the side panels, wherein the tank is configured to receive, store, and release liquid;
- a misting structure comprising a mister and a misting structure coupling, wherein the misting structure is configured to create a mist within the evaporative air cooler;
- a filter structure with a plurality of filters, wherein the plurality of filters are configured to absorb the mist; and
- a fan configured to draw the ambient air into the evaporative air cooler, wherein the ambient air is cooled by at least one of the mist and the filter structure, and wherein the fan directs the ambient air thorough the filter structure and from the interior.

Clause 2. The evaporative air cooler of any preceding clause, wherein the plurality of filters are formed from a sponge material and positioned to define gaps between the plurality of filters.

Clause 3. The evaporative air cooler of any preceding clause, wherein the filter structure is positioned in a drawer; and
  wherein the drawer is removable from the evaporative air cooler.

Clause 4. The evaporative air cooler of any preceding clause, further comprising a front grill with a tab for pulling the drawer from the evaporative air cooler.

Clause 5. The evaporative air cooler of any preceding clause, wherein the plurality of filters are removable from the evaporative air cooler and configured to be soaked with liquid prior to entering the evaporative air cooler.

Clause 6. The evaporative air cooler of any preceding clause, wherein the plurality of filters are aligned parallel to each other and define air gaps between the plurality of filters; and
  wherein the ambient air is cooled before exiting the evaporative air cooler.

Clause 7. The evaporative air cooler of any preceding clause, wherein the misting structure distributes the mist into the ambient air and onto the plurality of filters.

Clause 8. The evaporative air cooler of any preceding clause, wherein the tank comprises a liquid inlet and a liquid outlet;
  wherein liquid enters the tank through the liquid inlet and exits the tank through the liquid outlet;
  wherein the misting structure is in liquid communication with the tank and configured to create a mist as the liquid flows through the liquid outlet; and
  wherein the mister is positioned within the tank wherein the liquid flows from the tank toward the mister.

Clause 9. The evaporative air cooler of any preceding clause, wherein the misting structure creates a first volume of mist when the fan is at a first speed; and
  wherein the misting structure creates a second volume of mist when the fan is at a second speed.

Clause 10. The evaporative air cooler of any preceding clause, wherein the first volume is larger than the second volume; and
  wherein the first speed is faster than the second speed.

Clause 11. The evaporative air cooler of any preceding clause, further comprising:
  an internal assembly configured to form a seal with the fan, wherein the seal causes the ambient air to exit the evaporative air cooler with a greater force than when entering the evaporative air cooler.

Clause 12. The evaporative air cooler of any preceding clause, wherein the internal assembly comprises the filter structure and a drawer.

Clause 13. The evaporative air cooler of any preceding clause, wherein the filter structure is configured for removal from the interior; and
  wherein the filter structure and the plurality of filters are washable and reusable.

Clause 14. The evaporative air cooler of any preceding clause, wherein the plurality of filters are formed from sponge-like material.

Clause 15. The evaporative air cooler of any preceding clause, further comprising:
  a shroud adjacent to an underside of the tank, wherein the shroud is v-shaped.

Clause 16. An evaporative air cooler for cooling ambient air, comprising:
- a housing with a top panel, a bottom panel, and side panels defining an interior of the evaporative air cooler;
- a tank positioned adjacent to the top panel and at least one of the side panels and configured to receive, store, and release liquid;
- a misting structure comprising a mister and a misting structure coupling, wherein the misting structure is in fluid communication with the tank, and wherein the misting structure is configured to create a mist within the evaporative air cooler;
- a filter structure with a plurality of filters, wherein the plurality of filters are configured to absorb the mist, and wherein the filter structure is adjacent to the bottom panel and at least one of the side panels;
- a fan configured to draw the ambient air into the evaporative air cooler, wherein the ambient air is cooled by at least one of the mist and the filter structure, and wherein the fan directs the ambient air through the filter structure and from the interior; and
- a v-shaped shroud positioned underneath the tank and configured to direct the mist toward the filter structure.

Clause 17. The evaporative air cooler of any preceding clause, further comprising:
  a fan cover adjacent to the fan and configured to direct air from outside the evaporative air cooler toward the v-shaped shroud, wherein the fan is positioned adjacent to at least one of the side panels.

Clause 18. The evaporative air cooler of any preceding clause, wherein the v-shaped shroud directs the mist toward a top portion of the filter structure and through the filter structure.

Clause 19. The evaporative air cooler of any preceding clause, wherein the filter structure comprises a plurality of filters aligned parallel to each other and defining air gaps;
   wherein the plurality of filters stores the mist; and
   wherein air is cooled by the mist, travels through the air gaps, and exits the evaporative air cooler through one of the side panels.

Clause 20. The evaporative air cooler of any preceding clause, further comprising:
   an internal assembly attached to one of the side panels, wherein the one of the side panels is configured to detach from the evaporative air cooler;
   wherein the internal assembly comprises a drawer attached to the one of the side panels;
   wherein the drawer includes a water tray angled toward the one of the side panels; and
   wherein the filter structure is positioned on the water tray, and the filter structure is positioned adjacent to the one of the side panels.

Clause 21. An evaporative air cooler for cooling air, comprising:
   a housing defining an interior of the evaporative air cooler;
   a tank positioned adjacent to a top portion of the housing, wherein the tank is configured to receive, store, and release liquid;
   a mister in fluid communication with the tank, wherein the mister is configured to create a mist from the liquid;
   a filter structure with a filter, wherein the filter is configured to absorb the mist;
   a fan configured to draw the air into the interior, wherein the air is cooled by at least one of the mist and the filter, and wherein the fan directs the air through the filter structure and from the interior; and
   a clip coupled to the housing.

Clause 22. The evaporative air cooler of any preceding clause, wherein the filter is formed from a sponge material.

Clause 23. The evaporative air cooler of any preceding clause, wherein the filter is configured in a zig-zag formation and defines air gaps.

Clause 24. The evaporative air cooler of any preceding clause, further comprising a second filter coupled to at least a portion of a perimeter of the filter structure, wherein the second filter is configured to absorb the mist.

Clause 25. The evaporative air cooler of any preceding clause, wherein the second filter is in fluid communication with the filter.

Clause 26. The evaporative air cooler of any preceding clause, wherein the filter structure is configured for removal from the interior;
   wherein the filter structure and the filter are washable and reusable; and
   wherein the filter is configured to store liquid.

Clause 27. The evaporative air cooler of any preceding clause, further comprising an angling member coupled to the housing, wherein the angling member is configured to rotate the housing.

Clause 28. The evaporative air cooler of any preceding clause, wherein the angling member is configured to rotate the housing in at least one of a vertical direction and a horizontal direction.

Clause 29. The evaporative air cooler of any preceding clause, wherein the angling member is configured to rotate the housing 360 degrees.

Clause 30. The evaporative air cooler of any preceding clause, wherein the clip is coupled to the angling member.

Clause 31. The evaporative air cooler of any preceding clause, wherein the clip is configured to removably couple the evaporative air cooler to an object.

Clause 32. The evaporative air cooler of any preceding clause, further comprising a grill configured to removably couple to the housing.

Clause 33. The evaporative air cooler of any preceding clause, further comprising a safety interlock configured to prevent operation of the evaporative air cooler if at least one of the grill and the filter structure is removed from the housing.

Clause 34. The evaporative air cooler of any preceding clause, wherein the tank comprises a liquid inlet and a liquid outlet;
   wherein liquid enters the tank through the liquid inlet and exits the tank through the liquid outlet; and
   wherein, in response to the liquid flowing through the liquid outlet, the mister is configured to create the mist.

Clause 35. The evaporative air cooler of any preceding clause, further comprising:
   a fan cover adjacent to the fan, wherein the fan cover is configured to direct the air from the fan toward the filter structure.

Clause 36. An evaporative air cooler for cooling air, comprising:
   a housing defining an interior of the evaporative air cooler;
   a tank positioned adjacent to a top portion of the housing, wherein the tank is configured to receive, store, and release liquid;
   a mister in fluid communication with the tank, wherein the mister is configured to create a mist from the liquid;
   a filter structure with a filter, wherein the filter is configured to absorb the mist;
   a fan configured to draw the air into the interior, wherein the air is cooled by at least one of the mist and the filter, and wherein the fan directs the air through the filter structure and from the interior;
   an angling member coupled to the housing, wherein the angling member is configured to rotate the housing; and
   a clip coupled to the angling member.

Clause 37. The evaporative air cooler of any preceding clause, wherein the angling member is configured to rotate the housing in at least one of a vertical direction and a horizontal direction.

Clause 38. The evaporative air cooler of any preceding clause, wherein the clip is configured to removably couple the evaporative air cooler to an object.

Clause 39. An evaporative air cooler for cooling air, comprising:
   a housing defining an interior of the evaporative air cooler;
   a tank positioned adjacent to a top portion of the housing, wherein the tank is configured to receive, store, and release liquid;
   a mister in fluid communication with the tank, wherein the mister is configured to create a mist from the liquid;
   a filter structure with a filter and a second filter, wherein the filter and the second filter are configured to absorb the mist;
   a fan configured to draw the air into the interior, wherein the air is cooled by at least one of the mist, the filter, and the second filter, and wherein the fan directs the air through the filter structure and from the interior; and
   a clip coupled to the housing.

Clause 40. The evaporative air cooler of any preceding clause, wherein the filter is configured in a zig-zag formation and defines air gaps;

wherein the second filter is coupled to at least a portion of a perimeter of the filter structure; and wherein the second filter is in fluid communication with the filter.

No part of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

The foregoing description, for purposes of explanation, use specific nomenclature to provide a thorough understanding of the described embodiments. However, it should be apparent to one skilled in the art that the specific details are not required to practice the described embodiments. Thus, the foregoing descriptions of specific embodiments are presented for purposes of illustration and description. They are not intended to be exhaustive or to limit the described embodiments to the precise forms disclosed. It should be apparent to one of ordinary skill in the art that many modifications and variations are possible in view of the above teachings.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An evaporative air cooler for cooling air, comprising:
   a housing defining an interior of the evaporative air cooler;
   a tank positioned adjacent to a top portion of the housing, wherein the tank is configured to receive, store, and release liquid;
   a mister in fluid communication with the tank, wherein the mister is configured to create a mist from the liquid;
   a filter structure with a filter, wherein the filter is configured to absorb the mist produced by the mister positioned above the filter structure;
   a fan configured to draw the air into the interior, wherein the air is cooled by at least one of the mist and the filter, and wherein the fan directs the air through the filter structure and from the interior;
   a clip coupled to the housing, the clip configured to removably and selectively couple the evaporative air cooler to an object; and
   an angling member coupled to the housing,
   wherein the clip includes a grip end extending beyond a clip base securely attached to a base of the angling member in a closed position of the clip, and
   wherein the mister is configured to distribute the mist into a space defined between the fan and the filter structure within the evaporative air cooler.

2. The evaporative air cooler of claim 1, wherein the filter is formed from a sponge material.

3. The evaporative air cooler of claim 1, wherein the filter structure includes a plurality of bars to form a zig-zag configuration of the filter such that the filter is positioned between air gaps formed between the bars.

4. The evaporative air cooler of claim 1, further comprising a second filter coupled to at least a portion of a perimeter of the filter structure, wherein the second filter is configured to absorb the mist.

5. The evaporative air cooler of claim 4, wherein the second filter is in fluid communication with the filter.

6. The evaporative air cooler of claim 1, wherein the filter structure is configured for removal from the interior;
   wherein the filter structure and the filter are washable and reusable; and
   wherein the filter is configured to store liquid.

7. The evaporative air cooler of claim 1, wherein the angling member is configured to rotate the housing.

8. The evaporative air cooler of claim 7, wherein the angling member is configured to rotate the housing in at least one of a vertical direction and a horizontal direction.

9. The evaporative air cooler of claim 7, wherein the angling member is configured to rotate the housing 360 degrees.

10. The evaporative air cooler of claim 7, wherein the clip is coupled to the angling member.

11. The evaporative air cooler of claim 1, further comprising a grill configured to removably couple to the housing.

12. The evaporative air cooler of claim 11, further comprising a safety interlock configured to prevent operation of the evaporative air cooler if at least one of the grill and the filter structure is removed from the housing.

13. The evaporative air cooler of claim 1, wherein the tank comprises a liquid inlet and a liquid outlet;
    wherein liquid enters the tank through the liquid inlet and exits the tank through the liquid outlet; and
    wherein, in response to the liquid flowing through the liquid outlet, the mister is configured to create the mist.

14. The evaporative air cooler of claim 1, further comprising:
    a fan cover adjacent to the fan, wherein the fan cover is configured to direct the air from the fan toward the filter structure.

15. An evaporative air cooler for cooling air, comprising:
    a housing defining an interior of the evaporative air cooler;
    a tank positioned adjacent to a top portion of the housing, wherein the tank is configured to receive, store, and release liquid;
    a mister in fluid communication with the tank, wherein the mister is configured to create a mist from the liquid;
    a filter structure with a filter, wherein the filter is configured to absorb the mist produced by the mister positioned above the filter structure;
    a fan configured to draw the air into the interior, wherein the air is cooled by at least one of the mist and the filter, and wherein the fan directs the air through the filter structure and from the interior;
    an angling member coupled to the housing, wherein the angling member is configured to rotate the housing; and
    a clip coupled to the angling member, the clip including at least one support plate configured to support the air cooler in an upright position when the clip is not engaged with an object.

16. The evaporative air cooler of claim 15, wherein the angling member is configured to rotate the housing in at least one of a vertical direction and a horizontal direction.

17. The evaporative air cooler of claim 15, wherein the clip is configured to removably couple the evaporative air cooler to an object.

18. An evaporative air cooler for cooling air, comprising:
- a housing defining an interior of the evaporative air cooler;
- a tank positioned adjacent to a top portion of the housing, wherein the tank is configured to receive, store, and release liquid;
- a mister in fluid communication with the tank, wherein the mister is configured to create a mist from the liquid;
- a filter structure with a filter and a second filter, wherein the filter and the second filter are configured to absorb the mist;
- a fan configured to draw the air into the interior, wherein the air is cooled by at least one of the mist, the filter, and the second filter, and wherein the fan directs the air through the filter structure and from the interior;
- a clip coupled to a bottom portion of the housing such that the clip is positioned underneath the housing, the clip configured to removably and selectively couple the evaporative air cooler to an object; and
- an angling member coupled to the housing,
- wherein the clip includes a grip end extending beyond a clip base securely attached to a base of the angling member in a closed position of the clip, and
- wherein the mister is configured to distribute the mist into a space defined between the fan and the filter structure within the evaporative air cooler.

19. The evaporative air cooler of claim 18, wherein the filter is configured in a zig-zag formation and defines air gaps;
- wherein the second filter is coupled to at least a portion of a perimeter of the filter structure; and wherein the second filter is in fluid communication with the filter.

\* \* \* \* \*